(12) United States Patent
Cazin et al.

(10) Patent No.: US 12,187,430 B2
(45) Date of Patent: Jan. 7, 2025

(54) UNDERWING-MOUNTED TRAILING EDGE BIFOLD FLAPS FOR WINGS OF AIRCRAFT

(71) Applicant: The Boeing Company, Arlington, VA (US)

(72) Inventors: Ryan Joseph Cazin, Lynwood, WA (US); Kevin Raylin Tsai, Redmond, WA (US)

(73) Assignee: The Boeing Company, Arlington, VA (US)

( * ) Notice: Subject to any disclaimer, the term of this patent is extended or adjusted under 35 U.S.C. 154(b) by 86 days.

(21) Appl. No.: 18/152,679

(22) Filed: Jan. 10, 2023

(65) Prior Publication Data

US 2024/0228017 A1    Jul. 11, 2024

(51) Int. Cl.
*B64C 9/18*        (2006.01)
*B64C 9/02*        (2006.01)

(52) U.S. Cl.
CPC . *B64C 9/18* (2013.01); *B64C 9/02* (2013.01)

(58) Field of Classification Search
CPC .... B64C 9/02; B64C 9/16; B64C 9/18; B64C 9/20
See application file for complete search history.

(56) References Cited

U.S. PATENT DOCUMENTS

| | | |
|---|---|---|
| 2,156,403 A | 5/1939 | Riviere |
| 2,271,763 A | 2/1942 | Fowler |
| 2,635,837 A | 4/1953 | Grant |
| 2,772,058 A | 11/1956 | Grant |
| 3,371,888 A | 3/1968 | Alavarez-Calderon |
| 3,698,664 A | 10/1972 | Bonney |
| 3,934,533 A | 1/1976 | Wainwright |
| 4,131,253 A | 12/1978 | Zapel |
| 4,427,168 A | 1/1984 | McKinney et al. |
| 4,444,368 A | 4/1984 | Andrews |
| 5,158,252 A | 10/1992 | Sakurai |

(Continued)

FOREIGN PATENT DOCUMENTS

| | | |
|---|---|---|
| DE | 662729 | 7/1938 |
| DE | 693082 | 7/1940 |

(Continued)

OTHER PUBLICATIONS

European Patent Office, "Extended European Search Report," issued in connection with European Patent Application No. 23214995.5, dated May 15, 2024, 5 pages.

(Continued)

*Primary Examiner* — Brady W Frazier
*Assistant Examiner* — Shanna Danielle Glover
(74) *Attorney, Agent, or Firm* — Hanley, Flight & Zimmerman, LLC

(57) ABSTRACT

Underwing-mounted trailing edge bifold flaps for wings of aircraft are disclosed. A bifold flap pivotally coupled to the wing is movable between a stowed position located along a lower surface of the wing and a deployed position located rearward of a trailing edge of the wing. The bifold flap includes a forward panel and an aft panel. The aft panel is pivotally coupled to the forward panel and foldable relative thereto. The aft panel is folded toward the forward panel when the bifold flap is in the stowed position. The aft panel is unfolded from the forward panel when the bifold flap is in the deployed position. A bullnose pivotally coupled to the forward panel pivots relative to the bifold flap as the bifold flap moves between the stowed and deployed positions.

15 Claims, 11 Drawing Sheets

(56) References Cited

U.S. PATENT DOCUMENTS

| | | | |
|---|---|---|---|
| 7,270,305 B2 | 9/2007 | Rampton et al. | |
| 8,925,869 B2 | 1/2015 | Friedel et al. | |
| 9,016,637 B2 | 4/2015 | Sakurai et al. | |
| 9,090,340 B2 | 7/2015 | Gölling | |
| 2009/0072093 A1* | 3/2009 | Fox | B64C 9/22 244/214 |
| 2009/0146016 A1* | 6/2009 | Kordel | B64C 9/02 244/215 |
| 2013/0214092 A1 | 8/2013 | Friedel | |
| 2019/0092454 A1* | 3/2019 | Mortland | B64C 13/28 |
| 2022/0024557 A1 | 1/2022 | Ji et al. | |

FOREIGN PATENT DOCUMENTS

| | | |
|---|---|---|
| DE | 1813407 | 7/1970 |
| EP | 103038 | 3/1984 |
| EP | 1338506 | 8/2006 |
| FR | 2347256 | 11/1977 |
| KR | 10-0535703 | 12/2005 |
| WO | 2015183347 | 12/2015 |
| WO | 2018009253 A1 | 1/2018 |

OTHER PUBLICATIONS

United States Patent and Trademark Office, "Notice of Allowance and Fee(s) Due," issued in connection with U.S. Appl. No. 18/152,687, dated Jun. 10, 2024, 8 pages.

United States Patent and Trademark Office, "Corrected Notice of Allowability," issued in connection with U.S. Appl. No. 18/152,687, dated Jun. 27, 2024, 2 pages.

* cited by examiner

SECTION A-A

UNDERWING-MOUNTED TRAILING EDGE BIFOLD FLAPS FOR WINGS OF AIRCRAFT

FIELD OF THE DISCLOSURE

This disclosure relates generally to flaps for wings of aircraft and, more specifically, to underwing-mounted trailing edge bifold flaps for wings of aircraft.

BACKGROUND

Aircraft wings are commonly equipped with high-lift devices located along and/or otherwise associated with the trailing edge of each wing. For example, an aircraft wing may include one or more trailing edge flap(s) that is/are movable between a stowed position (e.g., a retracted position) and a deployed position (e.g., an extended position) relative to a fixed portion of the wing. Movement of the trailing edge flap(s) from the stowed position into the deployed position typically increases the camber of the wing, which accordingly increases the extent, the amount, and/or the degree of lift (e.g., an increase in maximum lift coefficient) that the wing is capable of generating during flight of the aircraft. Increasing the camber and/or the maximum lift coefficient of a wing generally improves the aerodynamic performance of an aircraft, particularly with regard to takeoff and landing operations performed during flight of the aircraft.

In some known implementations, movement of a trailing edge flap from the stowed position into the deployed position occurs by sliding, translating, and/or otherwise extending the flap (e.g., a Fowler flap) rearward along and/or from one or more guide track(s) disposed on one or more structure(s) (e.g., one or more rib(s)) of the wing. In such known implementations, the upper and lower surfaces of the flap generally maintain their respective upward-facing and downward-facing orientations as the flap moves from the stowed position into the deployed position. The implementation of such a flap commonly requires the incorporation of a linkage assembly located along the underside of the wing below the lower surface of the wing. A fairing covering the linkage assembly is also typically incorporated along the underside of the wing below the lower surface of the wing. The fairing produces significant parasitic drag that negatively impacts the aerodynamic performance of the aircraft during flight, particularly during execution of a cruise operation by the aircraft.

SUMMARY

Underwing-mounted trailing edge bifold flaps for wings of aircraft are disclosed herein. In some examples, a wing of an aircraft is disclosed. In some disclosed examples, the wing includes an upper surface, a lower surface located opposite the upper surface, and a trailing edge located between the upper surface and the lower surface. In some disclosed examples, the wing further includes a bifold flap pivotally coupled to the wing. The bifold flap is movable between a stowed position located along the lower surface and a deployed position located rearward of the trailing edge. The bifold flap includes a forward panel and an aft panel. The aft panel is pivotally coupled to the forward panel and is foldable relative thereto. The aft panel is folded toward the forward panel when the bifold flap is in the stowed position. The aft panel is unfolded from the forward panel when the bifold flap is in the deployed position. In some disclosed examples, the wing further includes a bullnose pivotally coupled to the forward panel.

In some examples, a method is disclosed. In some disclosed examples, the method includes moving a bifold flap pivotally coupled to a wing of an aircraft. The wing includes an upper surface, a lower surface located opposite the upper surface, and a trailing edge located between the upper surface and the lower surface. The bifold flap is movable between a stowed position located along the lower surface and a deployed position located rearward of the trailing edge. The bifold flap includes a forward panel and an aft panel. The aft panel is pivotally coupled to the forward panel and is foldable relative thereto. The aft panel is folded toward the forward panel when the bifold flap is in the stowed position. The aft panel is unfolded from the forward panel when the bifold flap is in the deployed position. In some disclosed examples, a bullnose is pivotally coupled to the forward panel.

Figure 1:
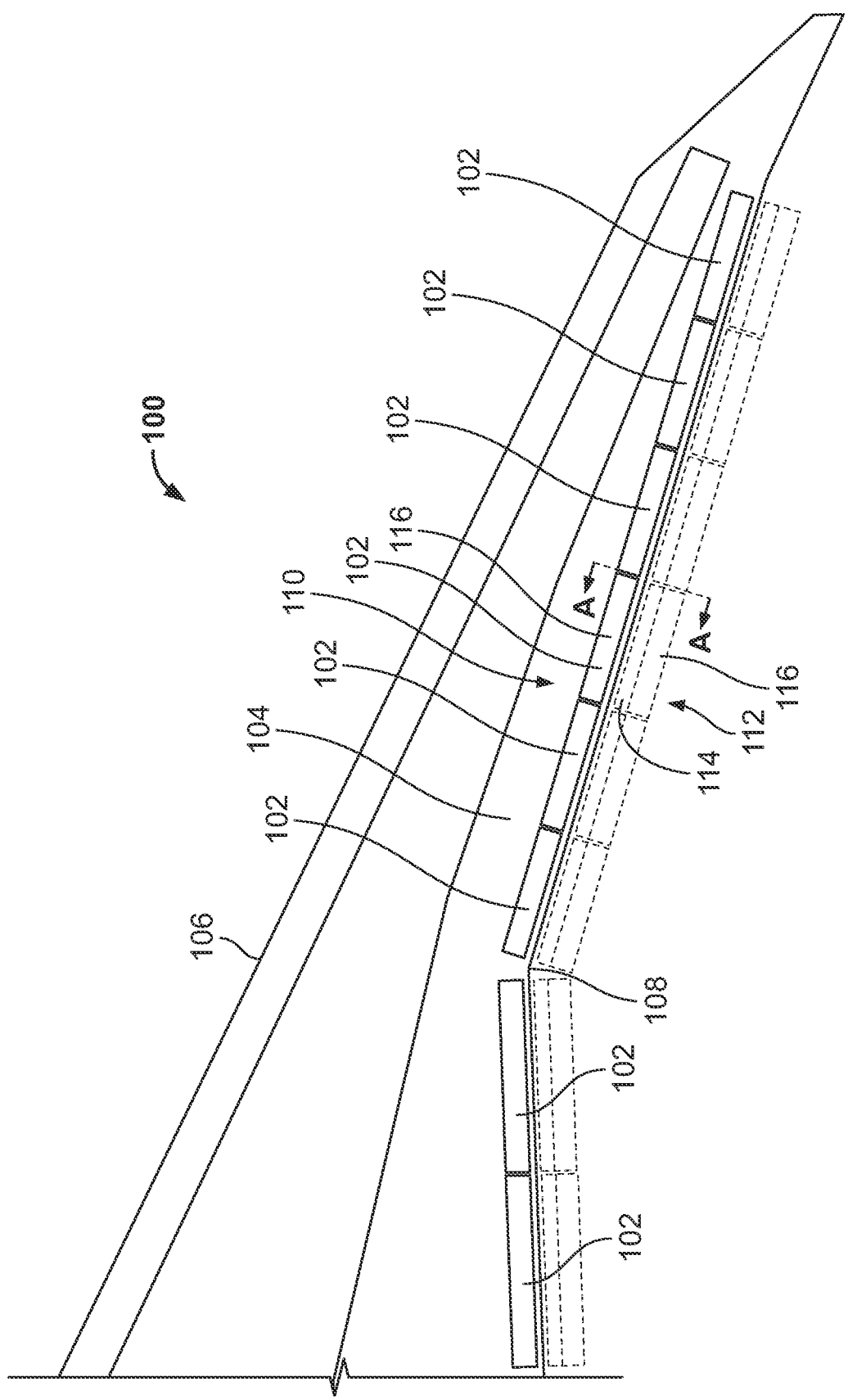
FIG. 1 is a bottom view of an example aircraft wing including an example underwing-mounted trailing edge bifold flap constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Underwing-mounted trailing edge bifold flaps for wings of aircraft as disclosed herein. In some disclosed examples, a wing of an aircraft includes an upper surface, a lower surface located opposite the upper surface, and a trailing edge located between the upper surface and the lower surface. The wing further includes a bifold flap pivotally coupled to the wing. The bifold flap is movable between a stowed position located along the lower surface and a deployed position located rearward of the trailing edge. Movement of the bifold flap is facilitated via a linkage assembly, the vast majority of which can be stowed within an internal compartment of the wing when the flap is in the stowed position. The aforementioned configuration of the linkage assembly advantageously eliminates the need for any fairing located along the underside of the wing (e.g., as may occur with track or linkage-deployed Fowler flaps), thereby reducing the significant parasitic drag that is attributable to such fairings. The reduction in drag provides for a corresponding increase in fuel efficiency associated with operating the aircraft. Movement of the bifold flap from the stowed position into the deployed position also advantageously increases both the effective area and the camber of the wing. Lower approach speeds are attainable due to the increased wing area and the increased camber, thereby providing for a safer aircraft that is capable of landing at airfields having relatively short runways or landing strips.

In some disclosed examples, the bifold flap includes a forward panel and an aft panel. The aft panel is pivotally coupled to the forward panel and foldable relative thereto. In some disclosed examples, the aft panel is folded toward the forward panel when the bifold flap is in the stowed position, and the aft panel is unfolded from the forward panel when the bifold flap is in the deployed position. Numerous performance benefits associated with the bifold flap (e.g., relative to a monolithic flap of a similar size and shape) are directly attributable to the foldable nature of the forward and aft panels of the bifold flap.

For example, when the bifold flap is in an initial deployment position (e.g., a scoop position), the respective sizes, the respective shapes, and the respective orientations of the forward and aft panels of the bifold flap cause an airflow profile associated with the bifold flap to demonstrate a scoop effect that is substantially reduced relative to a corresponding scoop effect demonstrated by a similarly sized and shaped monolithic flap. In this regard, the scoop effect associated with the bifold flap advantageously produces loads and pressures in relation to the bifold flap that are significantly reduced relative to the corresponding loads and pressures produced via the corresponding scoop effect associated with the monolithic flap. The reduced loads and pressures associated with the bifold flap when positioned in the initial deployment position advantageously reduce the amount of force and/or energy that is required of a linkage assembly in order to fully return the bifold flap from its deployed position all the way into its stowed position.

As another example, when the bifold flap is in a mid-deployment position (e.g., a barn door position), only the forward panel of the bifold flap has a substantially vertical orientation that is generally orthogonal to a streamwise airflow. By contrast, the aft panel of the bifold flap is advantageously oriented at a non-orthogonal angle relative to the streamwise airflow. The vertical extent of the bifold flap when so positioned is relatively small (e.g., in comparison to the vertical extent of a similarly sized and shaped monolithic flap), which in turn causes the bifold flap to generate adverse forces (e.g., aerodynamic drag) in response to the streamwise airflow that are significantly reduced (e.g., in comparison to the substantial adverse forces (e.g., substantial aerodynamic drag) produced by a similarly sized and shaped monolithic flap in response to a corresponding streamwise airflow). The reduced adverse forces associated with the bifold flap when positioned in the mid-deployment position advantageously reduce the amount of force and/or energy that is required of a linkage assembly in order to return the bifold flap from its deployed position into its stowed position.

The bifold flap demonstrates improved aerodynamic load mitigation relative to a similarly sized and shaped monolithic flap. The load reduction, which is directly attributable to the foldable nature of the forward and aft panels of the bifold flap, offers many advantages and/or benefits including, for example: (a) creating a smoother (e.g., aerodynamically optimized) transition of between the deployed position and the stowed position; (b) facilitating the implementation of smaller, simpler, and less expensive actuator and linkage assembly components; and (c) improving structural fatigue properties associated with the actuator and linkage assembly components.

In some disclosed examples, the wing advantageously includes a bullnose pivotally coupled to the bifold flap. The bullnose is located along an edge of the forward panel of the bifold flap, and is configured to pivot relative to the forward panel as the bifold flap moves between the stowed position and the deployed position. The bifold flap, the bullnose, and the linkage assembly are configured such that the bullnose is located entirely within an internal compartment of the wing when the bifold flap is in the stowed position, and such that the bullnose is located below the trailing edge of the wing when the bifold flap is in the deployed position. The bullnose includes a contoured surface that advantageously provides for an aerodynamically-tuned passage of an airflow through a gap located between the contoured surface of the bullnose and the trailing edge of the wing when the bifold flap is in the deployed position.

The above-identified features as well as other advantageous features of example underwing-mounted trailing edge bifold flaps for wings of aircraft as disclosed herein are further described below in connection with the figures of the application.

As used herein in a mechanical context, the term "configured" means sized, shaped, arranged, structured, oriented, positioned, and/or located. For example, in the context of a first object configured to fit within a second object, the first object is sized, shaped, arranged, structured, oriented, positioned, and/or located to fit within the second object. As used herein in an electrical and/or computing context, the term "configured" means arranged, structured, and/or programmed. For example, in the context of a controller configured to perform a specified operation, the controller is arranged, structured, and/or programmed (e.g., based on machine-readable instructions) to perform the specified operation.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the phrase "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
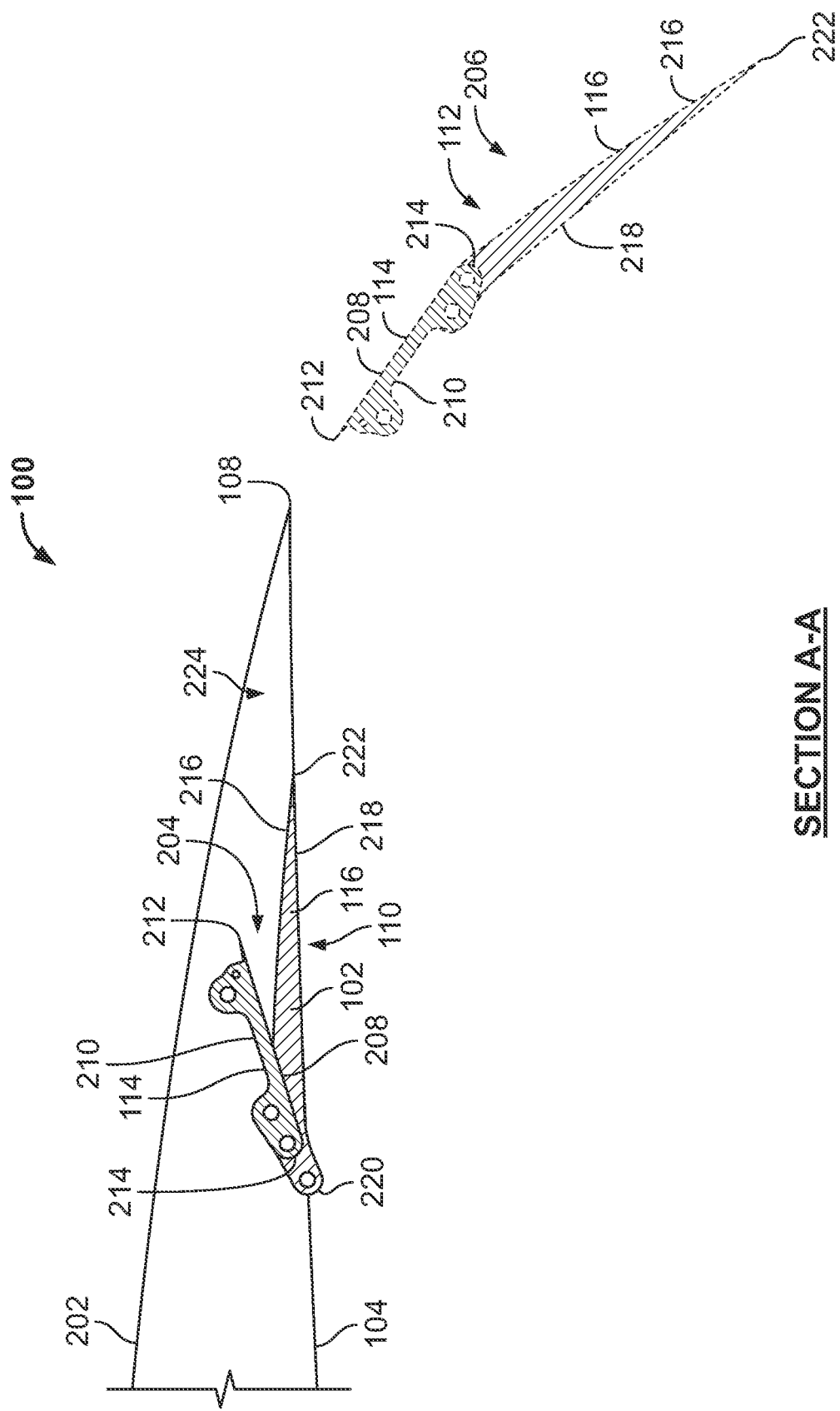
FIG. 2 is a cross-sectional view of the wing of FIG. 1 taken along section A-A of FIG. 1.

FIG. 1 is a bottom view of an example aircraft wing 100 including an example underwing-mounted trailing edge bifold flap 102 constructed in accordance with the teachings of this disclosure. FIG. 2 is a cross-sectional view of the wing 100 of FIG. 1 taken along section A-A of FIG. 1. The wing 100 and the bifold flap 102 of FIGS. 1 and 2 can be implemented on any type of aircraft including, for example, commercial aircraft, military aircraft, manned aircraft, unmanned aircraft, etc. In the illustrated example of FIGS. 1 and 2, the wing 100 is configured as a rearward-swept wing. In other examples, the wing 100 can instead be configured with a different wing shape and/or wing profile, including, for example, a forward-swept wing, an un-swept (e.g., straight) wing, a delta wing, etc. In the illustrated example of FIGS. 1 and 2, the wing 100 includes eight (8) separate instances of the bifold flap 102. In other examples, the wing 100 can instead include a different number (e.g., 1, 2, 4, 6, 10, etc.) of instances of the bifold flap 102.

The wing 100 of FIGS. 1 and 2 includes an example upper surface 202, an example lower surface 104, an example leading edge 106, and an example trailing edge 108. The lower surface 104 of the wing 100 is located opposite the upper surface 202 of the wing 100. The leading edge 106 of the wing 100 is located between (e.g., extends between) the upper surface 202 and the lower surface 104 of the wing 100. The trailing edge 108 of the wing 100 is located between (e.g., extends between) the upper surface 202 and the lower surface 104 of the wing 100, opposite the leading edge 106 of the wing 100. In the illustrated example of FIGS. 1 and 2, the trailing edge 108 of the wing 100 is a fixed trailing edge that does not itself move, but to which the bifold flap 102 of the wing 100 is movable relative thereto. In other examples, the trailing edge 108 of the wing 100 can instead be implemented as and/or defined by a movable wing structure including, for example, an aileron of the wing 100, a variable camber portion of the wing 100, etc., that the bifold flap 102 of the wing 100 moves relative to.

The bifold flap 102 of FIGS. 1 and 2 is pivotally coupled to the wing 100. FIGS. 1 and 2 illustrates the bifold flap 102 in an example stowed position 110 (e.g., shown in solid-line format) as well as an example deployed position 112 (e.g., shown in broken-line format) relative to the trailing edge 108 of the wing 100. The bifold flap 102 of FIGS. 1 and 2 is movable (e.g., pivotable) between the stowed position 110 and the deployed position 112 via an actuation mechanism and/or or a linkage assembly disposed along and/or mounted to an underside of the wing 100. The bifold flap 102 is located along the lower surface 104 of the wing 100 when the bifold flap 102 is in the stowed position 110. At least a portion of the bifold flap 102 (e.g., the majority, or the entirety, of the bifold flap 102) is located rearward of the trailing edge 108 of the wing 100 when the bifold flap 102 is in the deployed position 112.

The bifold flap 102 of FIGS. 1 and 2 includes an example forward panel 114 and an example aft panel 116. The aft panel 116 of the bifold flap 102 is pivotally coupled to the forward panel 114 of the bifold flap 102 such that the aft panel 116 is movable (e.g., pivotable) relative to the forward panel 114. In the illustrated example of FIGS. 1 and 2, the forward panel 114 and the aft panel 116 of the bifold flap 102 are in an example folded configuration 204 relative to one another when the bifold flap 102 is in the stowed position 110. As shown in FIG. 2, the aft panel 116 of the bifold flap 102 substantially overlaps and/or covers the forward panel 114 of the bifold flap 102 when the forward panel 114 and the aft panel 116 are in the folded configuration 204, and/or when the bifold flap 102 is in the stowed position 110. Conversely, the forward panel 114 and the aft panel 116 of the bifold flap 102 are in an example unfolded configuration 206 relative to one another when the bifold flap 102 is in the deployed position 112. As shown in FIG. 2, the aft panel 116 of the bifold flap 102 is located rearward of the forward panel 114 of the bifold flap 102 when the forward panel 114 and the aft panel 116 are in the unfolded configuration 206, and/or when the bifold flap 102 is in the deployed position 112.

The forward panel 114 of the bifold flap 102 of FIGS. 1 and 2 includes an example first surface 208, an example second surface 210, an example first edge 212, and an example second edge 214. The second surface 210 of the forward panel 114 is located opposite the first surface 208 of the forward panel 114. The first edge 212 of the forward panel 114 is located between (e.g., extends between) the first surface 208 and the second surface 210 of the forward panel 114. The second edge 214 of the forward panel 114 is located between (e.g., extends between) the first surface 208 and the second surface 210 of the forward panel 114, opposite the first edge 212 of the forward panel 114.

The aft panel 116 of the bifold flap 102 of FIGS. 1 and 2 includes an example first surface 216, an example second surface 218, an example first edge 220, and an example second edge 222. The second surface 218 of the aft panel 116 is located opposite the first surface 216 of the aft panel 116. The first edge 220 of the aft panel 116 is located between (e.g., extends between) the first surface 216 and the second surface 218 of the aft panel 116. The second edge 222 of the aft panel 116 is located between (e.g., extends between) the first surface 216 and the second surface 218 of the aft panel 116, opposite the first edge 220 of the aft panel 116.

In the illustrated example of FIGS. 1 and 2, the forward panel 114 of the bifold flap 102 inverts and/or reverses its orientation as the bifold flap 102 moves from the stowed position 110 into the deployed position 112. When the bifold flap 102 of FIGS. 1 and 2 is in the stowed position 110, the first surface 208 of the forward panel 114 faces and/or is generally oriented downward, the second surface 210 of the forward panel 114 faces and/or is generally oriented upward, the first edge 212 of the forward panel 114 faces and/or is generally oriented rearward, and the second edge 214 of the forward panel 114 faces and/or is generally oriented forward. Conversely, when the bifold flap 102 of FIGS. 1 and 2 is in the deployed position 112, the first surface 208 of the forward panel 114 faces and/or is generally oriented upward, the second surface 210 of the forward panel 114 faces and/or is generally oriented downward, the first edge 212 of the forward panel 114 faces and/or is generally oriented forward, and the second edge 214 of the forward panel 114 faces and/or is generally oriented rearward. As shown in FIG. 2, the first edge 212 of the forward panel 114 is located rearward of the second edge 214 of the forward panel 114 when the bifold flap 102 is in the stowed position 110, and the first edge 212 of the forward panel 114 is located forward of the second edge 214 of the forward panel 114 when the bifold flap 102 is in the deployed position 112.

In the illustrated example of FIGS. 1 and 2, a portion of the aft panel 116 of the bifold flap 102 located along or proximate to the first edge 220 of the aft panel 116 is pivotally coupled to a portion of the forward panel 114 of the bifold flap 102 located along and/or proximate to the second edge 214 of the forward panel 114 such that the aft panel 116 is foldable relative to the forward panel 114. The aft panel 116 of the bifold flap 102 of FIGS. 1 and 2 is configured to pivot and/or fold relative to the forward panel 114 of the bifold flap 102 as the bifold flap 102 moves between the stowed position 110 and the deployed position 112. When the bifold flap 102 is in the stowed position 110, the forward panel 114 and the aft panel 116 of the bifold flap 102 are both generally located within an example internal compartment 224 of the wing 100 spatially and/or physically bounded by the upper surface 202, the lower surface 104, and the trailing edge 108 of the wing 100. When so positioned, the aft panel 116 of the bifold flap 102 is folded toward the forward panel 114 of the bifold flap 102 (e.g., in the folded configuration 204) such that the first surface 216 of the aft panel 116 and the first surface 208 of the forward panel 114 face and/or are generally oriented toward one another, and such that the second surface 218 of the aft panel 116 and the second surface 210 of the forward panel 114 face and/or are generally oriented away from one another.

When the bifold flap 102 is in the deployed position 112, both the forward panel 114 and the aft panel 116 of the bifold flap 102 are located below and/or rearward of the trailing edge 108 of the wing 100. When so positioned, the aft panel 116 of the bifold flap 102 is unfolded from (e.g., folded away from) the forward panel 114 of the bifold flap 102 (e.g., in the unfolded configuration 206) such that the first surface 216 of the aft panel 116 and the first surface 208 of the forward panel 114 face and/or are generally oriented in a same, similar, and/or common direction (e.g., upwards), and such that the second surface 218 of the aft panel 116 and the second surface 210 of the forward panel 114 face and/or are generally oriented in another same, similar, and/or common direction (e.g., downwards).

As shown in FIGS. 1 and 2, regardless of whether the bifold flap 102 is in the stowed position 110 or the deployed position 112, the first surface 216 of the aft panel 116 faces and/or is generally oriented upward, the second surface 218 of the aft panel 116 faces and/or is generally oriented downward, the first edge 220 of the aft panel 116 faces and/or is generally oriented rearward, and the second edge 222 of the aft panel 116 faces and/or is generally oriented forward. Thus, unlike the forward panel 114 of the bifold flap 102, which inverts and/or reverses its orientation as the bifold flap 102 moves from the stowed position 110 into the deployed position 112, the aft panel 116 of the bifold flap 102, which pivots relative to the forward panel 114 of the bifold flap 102, generally maintains its orientation as the bifold flap 102 moves from the stowed position 110 into the deployed position 112. The first edge 220 of the aft panel 116 accordingly remains located forward of the second edge 222 of the aft panel 116 regardless of whether the bifold flap 102 is in the stowed position 110 or the deployed position 112.

Figure 3:
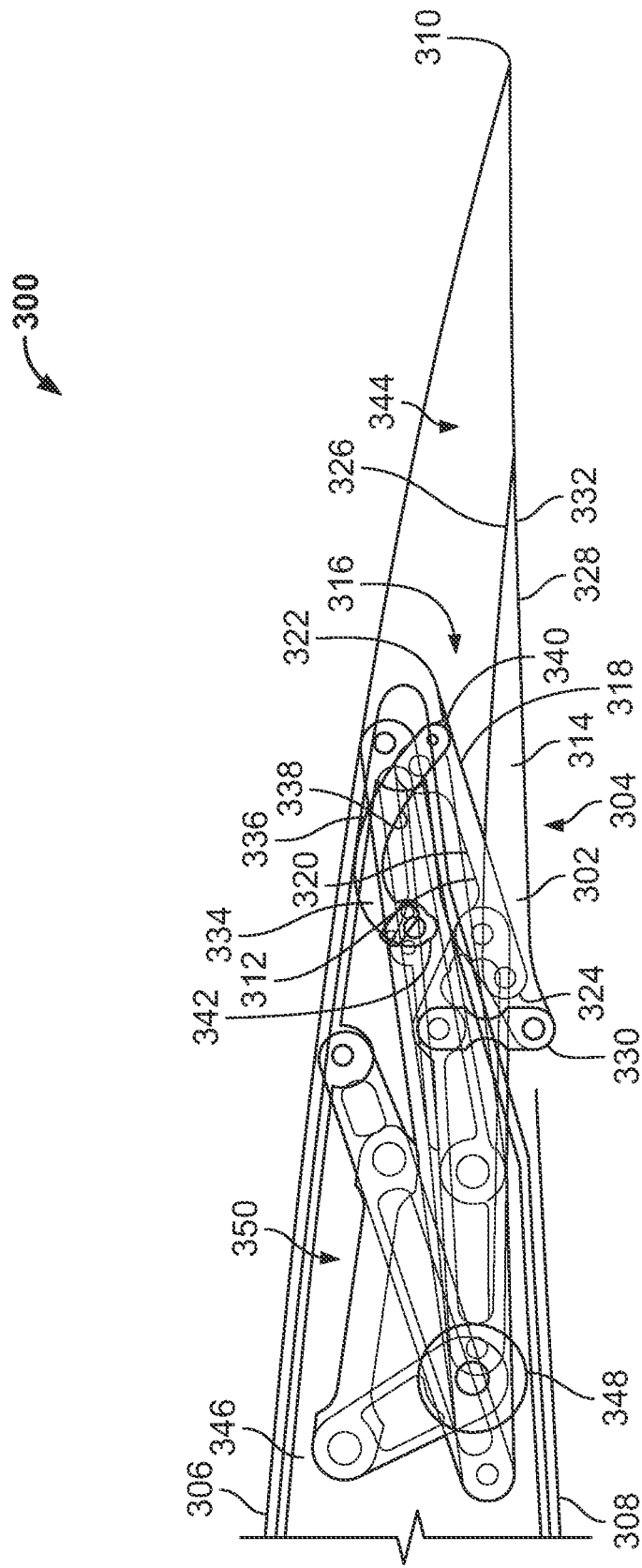
FIG. 3 is a cross-sectional view of an example aircraft wing including an example bifold flap illustrated in an example stowed position.
Figure 4:
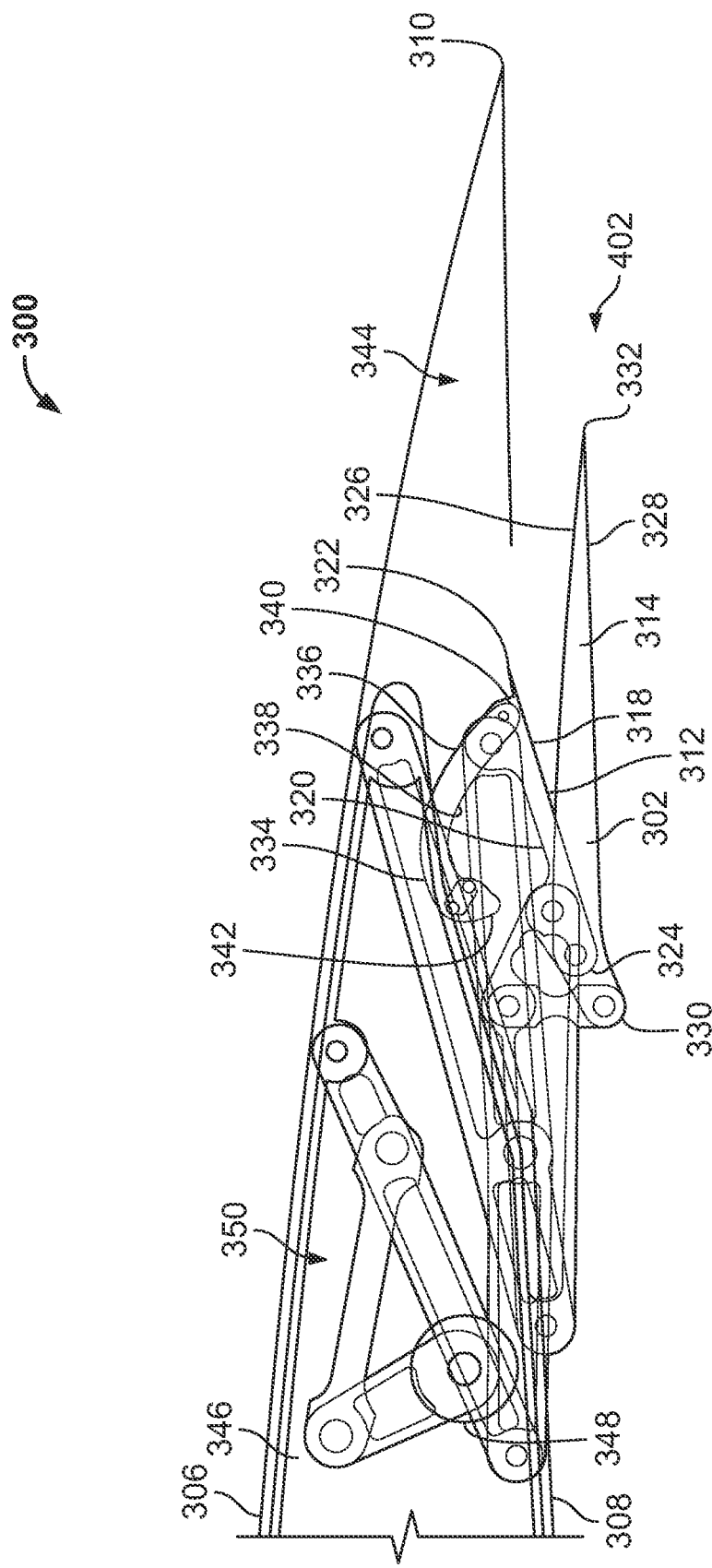
FIG. 4 is a cross-sectional view of the wing of FIG. 3, illustrating the bifold flap of FIG. 3 in a first example intermediary position.
Figure 5:
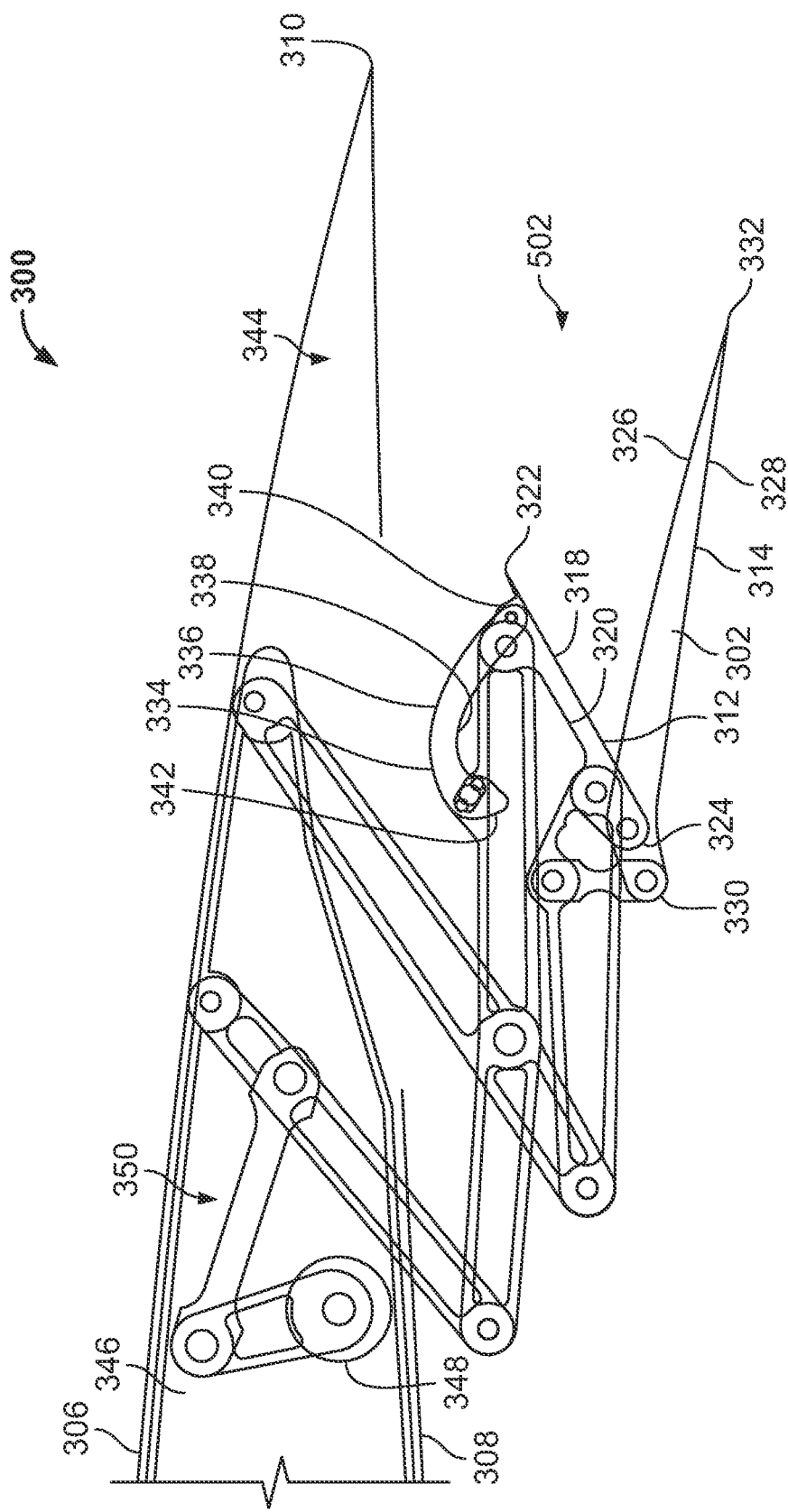
FIG. 5 is a cross-sectional view of the wing of FIGS. 3 and 4, illustrating the bifold flap of FIGS. 3 and 4 in a second example intermediary position.
Figure 6:
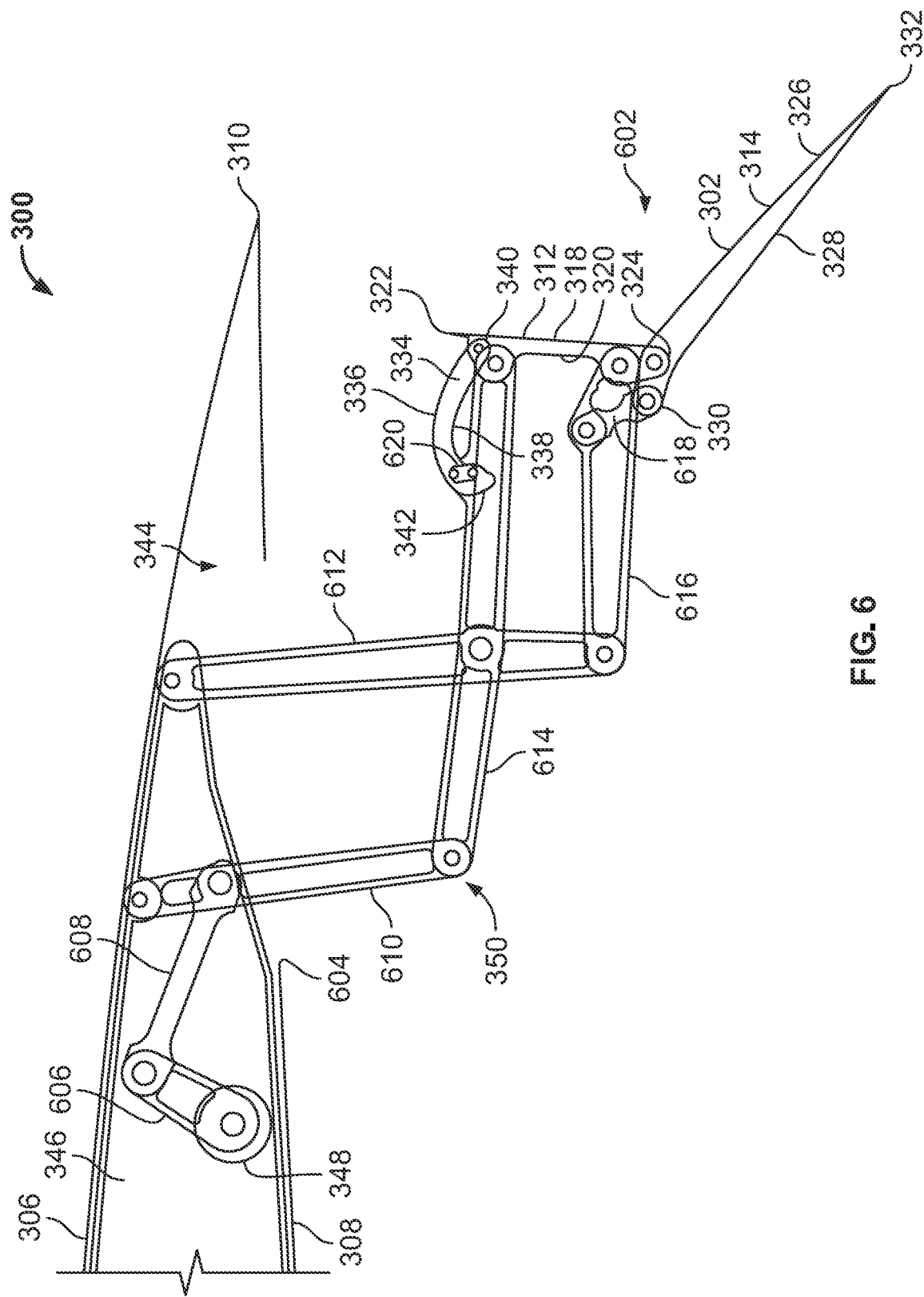
FIG. 6 is a cross-sectional view of the wing of FIGS. 3-5, illustrating the bifold flap of FIGS. 3-5 in a third example intermediary position.
Figure 7:
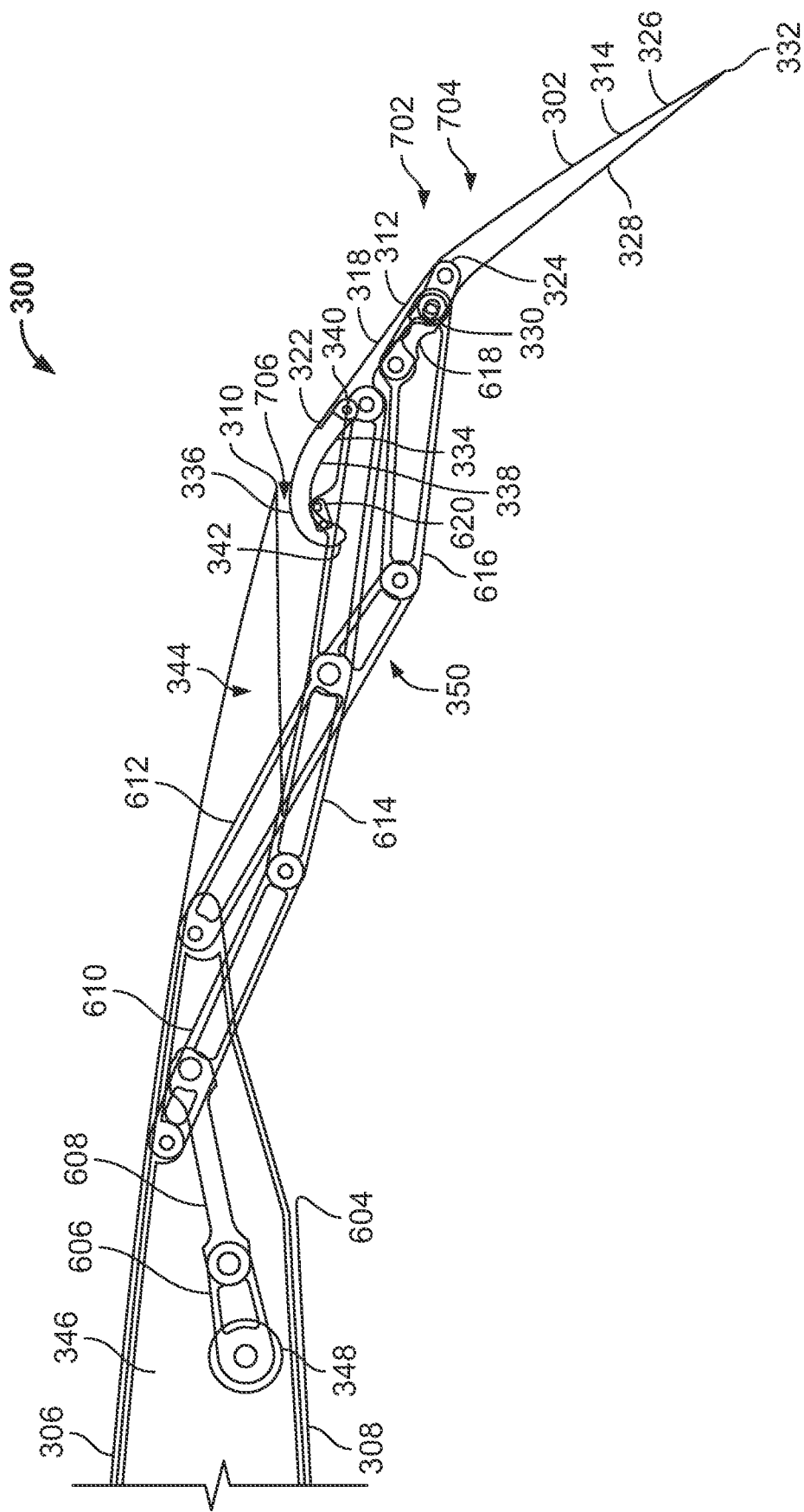
FIG. 7 is a cross-sectional view of the wing of FIGS. 3-6, illustrating the bifold flap of FIGS. 3-6 in an example deployed position.

FIG. 3 is a cross-sectional view of an example aircraft wing 300 including an example bifold flap 302 illustrated in an example stowed position 304. FIG. 4 is a cross-sectional view of the wing 300 of FIG. 3, illustrating the bifold flap 302 of FIG. 3 in a first example intermediary position 402. FIG. 5 is a cross-sectional view of the wing 300 of FIGS. 3 and 4, illustrating the bifold flap 302 of FIGS. 3 and 4 in a second example intermediary position 502. FIG. 6 is a cross-sectional view of the wing 300 of FIGS. 3-5, illustrating the bifold flap 302 of FIGS. 3-5 in a third example intermediary position 602. FIG. 7 is a cross-sectional view of the wing 300 of FIGS. 3-6, illustrating the bifold flap 302 of FIGS. 3-6 in an example deployed position 702. The wing 300 and the bifold flap 302 of FIGS. 3-7 are example implementations of the wing 100 and the bifold flap 102 of FIG. 1 described above.

The wing 300 of FIGS. 3-7 includes an example upper surface 306, an example lower surface 308, and an example trailing edge 310. The lower surface 308 of the wing 300 is located opposite the upper surface 306 of the wing 300. The trailing edge 310 of the wing 300 is located between (e.g., extends between) the upper surface 306 and the lower surface 308 of the wing 300, opposite a leading edge of the wing 300. In the illustrated example of FIGS. 3-7, the trailing edge 310 of the wing 300 is a fixed trailing edge that does not itself move, but to which the bifold flap 302 of the wing 300 is movable relative thereto.

The bifold flap 302 of FIGS. 3-7 is pivotally coupled to the wing 300. In this regard, the bifold flap 302 is movable (e.g., pivotable) relative to the trailing edge 310 of the wing 300 between the stowed position 304 shown in FIG. 3 and the deployed position 702 shown in FIG. 7. The bifold flap 302 passes through one or more intermediary positions (e.g., the first intermediary position 402 shown in FIG. 4, the second intermediary position 502 shown in FIG. 5, the third intermediary position 602 shown in FIG. 6, etc.) as the bifold flap 302 moves from the stowed position 304 of FIG. 3 into the deployed position 702 of FIG. 7. In some examples, one or more of such intermediary positions constitute stationary deployment positions at which the bifold flap 302 can be fixed, held, and/or otherwise maintained (e.g., during a flight of an aircraft) when the bifold flap 302 is not in the stowed position 304 of FIG. 3. In other examples, the bifold flap 302 can instead be configured such that the deployed position 702 of FIG. 7 constitutes the only stationary deployment position at which the bifold flap 302 can be fixed, held, and/or otherwise maintained (e.g., during a flight of an aircraft) when the bifold flap 302 is not in the stowed position 304 of FIG. 3.

The bifold flap 302 of FIGS. 3-7 is located along the lower surface 308 of the wing 300 when the bifold flap 302 is in the stowed position 304 shown in FIG. 3. In the illustrated example of FIGS. 3-7, the wing 300 further includes an example opening 604 formed in the lower surface 308 of the wing 300. In some examples, the bifold flap 302 and the opening 604 of the wing 300 are respectively configured such that at least a portion of the bifold flap 302 is located within, bounded by, and/or positioned adjacent to the opening 604 when the bifold flap 302 is in the stowed position 304 of FIG. 3. The bifold flap 302 of the wing 300 of FIGS. 3-7 is deployable from and/or through the opening 604 in connection with the bifold flap 302 moving away from the stowed position 304 of FIG. 3 toward the deployed position 702 of FIG. 7. At least a portion of the bifold flap 302 (e.g., the majority, or the entirety, of the bifold flap 302) is located rearward of the trailing edge 310 of the wing 300 when the bifold flap 302 is in the deployed position 702 of FIG. 7.

In the illustrated example of FIGS. 3-7, the bifold flap 302 includes an example forward panel 312 and an example aft panel 314. The aft panel 314 of the bifold flap 302 is pivotally coupled to the forward panel 312 of the bifold flap 302 such that the aft panel 314 is movable (e.g., pivotable) relative to the forward panel 312. The forward panel 312 and the aft panel 314 of the bifold flap 302 are in an example folded configuration 316 relative to one another when the bifold flap 302 is in the stowed position 304 of FIG. 3. As shown in FIG. 3, the aft panel 314 of the bifold flap 302 substantially overlaps and/or covers the forward panel 312 of the bifold flap 302 when the forward panel 312 and the aft panel 314 are in the folded configuration 316 of FIG. 3, and/or when the bifold flap 302 is in the stowed position 304 of FIG. 3. Conversely, the forward panel 312 and the aft panel 314 of the bifold flap 302 are in an example unfolded configuration 704 relative to one another when the bifold flap 302 is in the deployed position 702 of FIG. 7. As shown in FIG. 7, the aft panel 314 of the bifold flap 302 is located rearward of the forward panel 312 of the bifold flap 302 when the forward panel 312 and the aft panel 314 are in the unfolded configuration 704 of FIG. 7, and/or when the bifold flap 302 is in the deployed position 702 of FIG. 7.

The forward panel 312 of the bifold flap 302 of FIGS. 3-7 includes an example first surface 318, an example second surface 320, an example first edge 322, and an example second edge 324. The second surface 320 of the forward panel 312 is located opposite the first surface 318 of the forward panel 312. The first edge 322 of the forward panel 312 is located between (e.g., extends between) the first surface 318 and the second surface 320 of the forward panel 312. The second edge 324 of the forward panel 312 is located between (e.g., extends between) the first surface 318 and the second surface 320 of the forward panel 312, opposite the first edge 322 of the forward panel 312. As shown in FIGS. 3-7, the first surface 318 of the forward panel 312 extends between the first edge 322 and the second edge 324 of the forward panel 312. The second surface 320 of the forward panel 312 similarly extends between the first edge 322 and the second edge 324 of the forward panel 312. In the illustrated example of FIGS. 3-7, the first surface 318 of the forward panel 312 has a generally planar profile (e.g., a generally flat profile). In other examples, the first surface 318 of the forward panel 312 can instead have a non-planar profile (e.g., a curved or contoured profile).

The aft panel 314 of the bifold flap 302 of FIGS. 3-7 includes an example first surface 326 (e.g., a third surface), an example second surface 328 (e.g., a fourth surface), an example first edge 330 (e.g., a third edge), and an example second edge 332 (e.g., a fourth edge). The second surface 328 of the aft panel 314 is located opposite the first surface 326 of the aft panel 314. The first edge 330 of the aft panel 314 is located between (e.g., extends between) the first surface 326 and the second surface 328 of the aft panel 314. The second edge 332 of the aft panel 314 adjoins the first surface 326 and the second surface 328 of the aft panel 314, and is opposite the first edge 330 of the aft panel 314. As shown in FIGS. 3-7, the first surface 326 of the aft panel 314 extends between the first edge 330 and the second edge 332 of the aft panel 314. The second surface 328 of the aft panel 314 similarly extends between the first edge 330 and the second edge 332 of the aft panel 314. In the illustrated example of FIGS. 3-7, the first surface 326 and the second surface 328 of the aft panel 314 respectively have a generally planar profile (e.g., a generally flat profile). In other examples, the first surface 326 and/or the second surface 328 of the aft panel 314 can instead have a non-planar profile (e.g., a curved or contoured profile).

As shown by the sequence of movements of the bifold flap 302 illustrated in FIGS. 3-7, the forward panel 312 of the bifold flap 302 inverts and/or reverses its orientation as the bifold flap 302 moves from the stowed position 304 of FIG. 4 into the deployed position 702 of FIG. 7. When the bifold flap 302 of FIGS. 3-7 is in the stowed position 304 of FIG. 3, the first surface 318 of the forward panel 312 faces and/or is generally oriented downward, the second surface 320 of the forward panel 312 faces and/or is generally oriented upward, the first edge 322 of the forward panel 312 faces and/or is generally oriented rearward, and the second edge 324 of the forward panel 312 faces and/or is generally oriented forward. Conversely, when the bifold flap 302 of FIGS. 3-7 is in the deployed position 702 of FIG. 7, the first surface 318 of the forward panel 312 faces and/or is generally oriented upward, the second surface 320 of the forward panel 312 faces and/or is generally oriented downward, the first edge 322 of the forward panel 312 faces and/or is generally oriented forward, and the second edge 324 of the forward panel 312 faces and/or is generally oriented rearward. The first edge 322 of the forward panel 312 is located rearward of the second edge 324 of the forward panel 312 when the bifold flap 302 is in the stowed position 304 of FIG. 3. Conversely, the first edge 322 of the forward panel 312 is located forward of the second edge 324 of the forward panel 312 when the bifold flap 302 is in the deployed position 702 of FIG. 7.

In the illustrated example of FIGS. 3-7, a portion of the aft panel 314 of the bifold flap 302 located along or proximate to the first edge 330 of the aft panel 314 is pivotally coupled to a portion of the forward panel 312 of the bifold flap 302 located along and/or proximate to the second edge 324 of the forward panel 312 such that the aft panel 314 is foldable relative to the forward panel 312. The aft panel 314 of the bifold flap 302 of FIGS. 3-7 is configured to pivot and/or fold relative to the forward panel 312 of the bifold flap 302 as the bifold flap 302 moves between the stowed position 304 of FIG. 3 and the deployed position 702 of FIG. 7. When the bifold flap 302 is in the stowed position 304 of FIG. 3, the forward panel 312 and the aft panel 314 of the bifold flap 302 are both generally located within an example internal compartment 344 of the wing 300 spatially and/or physically bounded by the upper surface 306, the lower surface 308, and the trailing edge 310 of the wing 300. When so positioned, the aft panel 314 of the bifold flap 302 is folded toward the forward panel 312 of the bifold flap 302 (e.g., in the folded configuration 316 of FIG. 3) such that the first surface 326 of the aft panel 314 and the first surface 318 of the forward panel 312 face and/or are generally oriented toward one another, and such that the second surface 328 of the aft panel 314 and the second surface 320 of the forward panel 312 face and/or are generally oriented away from one another.

When the bifold flap 302 is in the deployed position 702 of FIG. 7, both the forward panel 312 and the aft panel 314 of the bifold flap 302 are located below and/or rearward of the trailing edge 310 of the wing 300. When so positioned, the aft panel 314 of the bifold flap 302 is unfolded from (e.g., folded away from) the forward panel 312 of the bifold flap 302 (e.g., in the unfolded configuration 704 of FIG. 7) such that the first surface 326 of the aft panel 314 and the first surface 318 of the forward panel 312 face and/or are generally oriented in a same, similar, and/or common direction (e.g., upwards), and such that the second surface 328 of the aft panel 314 and the second surface 320 of the forward panel 312 face and/or are generally oriented in another same, similar, and/or common direction (e.g., downwards).

As shown in FIGS. 3-7, regardless of whether the bifold flap 302 is in the stowed position 304 of FIG. 3 or the deployed position 702 of FIG. 7, the first surface 326 of the aft panel 314 faces and/or is generally oriented upward, the second surface 328 of the aft panel 314 faces and/or is generally oriented downward, the first edge 330 of the aft panel 314 faces and/or is generally oriented rearward, and the second edge 332 of the aft panel 314 faces and/or is generally oriented forward. Thus, unlike the forward panel 312 of the bifold flap 302, which inverts and/or reverses its orientation as the bifold flap 302 moves from the stowed position 304 of FIG. 3 into the deployed position 702 of FIG. 7, the aft panel 314 of the bifold flap 302, which pivots relative to the forward panel 312 of the bifold flap 302, generally maintains its orientation as the bifold flap 302 moves from the stowed position 304 of FIG. 3 into the deployed position 702 of FIG. 7. The first edge 330 of the aft panel 314 accordingly remains located forward of the second edge 332 of the aft panel 314 regardless of whether the bifold flap 302 is in the stowed position 304 of FIG. 3 or the deployed position 702 of FIG. 7.

In some examples, the second surface 328 of the aft panel 314 of the bifold flap 302 is flush with the lower surface 308 of the wing 300 adjacent the opening 604 when the bifold flap 302 is fully retracted into the stowed position 304 of FIG. 3. Positioning the second surface 328 of the aft panel 314 of the bifold flap 302 in this manner relative to the lower surface 308 of the wing 300 adjacent the opening 604 advantageously reduces (e.g., minimizes) the possibility of aerodynamic drag that may be attributed to the presence of the bifold flap 302 when the bifold flap 302 is in the stowed position 304 of FIG. 3. Such a reduction in aerodynamic drag is beneficial to the operation of the aircraft during flight, particularly when the aircraft is performing a cruise operation while the bifold flap 302 is in the stowed position 304 of FIG. 3.

In the illustrated example of FIGS. 3-7, the wing 300 further includes an example bullnose 334 pivotally coupled to the forward panel 312 of the bifold flap 302. The bullnose 334 of FIGS. 3-7 includes an example first surface 336, an example second surface 338, an example first end 340, and an example second end 342. The second surface 338 of the bullnose 334 is located opposite the first surface 336 of the bullnose 334. The first end 340 of the bullnose 334 is located between (e.g., extends between) the first surface 336 and the second surface 338 of the bullnose 334. The second end 342 of the bullnose 334 is located between (extends between) the first surface 336 and the second surface 338 of the bullnose 334, opposite the first end 340 of the bullnose 334. As shown in FIGS. 3-7, the first surface 336 of the bullnose 334 extends between the first end 340 and the second end 342 of the bullnose 334. The second surface 338 of the bullnose 334 similarly extends between the first end 340 and the second end 342 of the bullnose 334.

In the illustrated example of FIGS. 3-7, the first surface 336 and the second end 342 of the bullnose 334 respectively have a curved or contoured profile. The first end 340 of the bullnose 334 is pivotally coupled to the forward panel 312 of the bifold flap 302 along or proximate to the first edge 322 of the forward panel 312. The second end 342 of the bullnose 334 is coupled to a structural component of the wing 300, such as to a component of a linkage assembly of the wing 300 that facilitates movement of the bifold flap 302 between the stowed position 304 of FIG. 3 and the deployed position 702 of FIG. 7.

The bullnose 334 of FIGS. 3-7 is configured to pivot relative to the forward panel 312 of the bifold flap 302 as the bifold flap 302 moves between the stowed position 304 of FIG. 3 and the deployed position 702 of FIG. 7. The bullnose 334 is located within the internal compartment 344 of the wing 300 when the bifold flap 302 is in the stowed position 304 of FIG. 3. When so positioned, the bullnose 334 is folded toward the forward panel 312 of the bifold flap 302 such that the first surface 336 of the bullnose 334 and the first surface 318 of the forward panel 312 face and/or are generally oriented away from one another, and such that the second surface 338 of the bullnose 334 and the second surface 320 of the forward panel 312 face and/or are generally oriented toward from one another.

When the bifold flap 302 is in the deployed position 702 of FIG. 7, the bullnose 334 is located below the trailing edge 310 of the wing 300. When so positioned, the bullnose 334 is unfolded from and/or relative to the forward panel 312 of the bifold flap 302 such that the first surface 336 of the bullnose 334 and the first surface 318 of the forward panel 312 face and/or are generally oriented in a same, similar direction, and/or common direction (e.g., upwards), and such that the second surface 338 of the bullnose 334 and the second surface 320 of the forward panel 312 face and/or are generally oriented in another same, similar, and/or common direction (e.g., downwards). As shown in FIGS. 3-7, regardless of whether the bifold flap 302 is in the stowed position 304 of FIG. 3 or the deployed position 702 of FIG. 7, the first surface 336 of the bullnose 334 faces and/or is generally oriented upward, the second surface 338 of the bullnose 334 faces and/or is generally oriented downward, the first end 340 of the bullnose 334 faces and/or is generally oriented rearward, and the second end 342 of the bullnose 334 faces and/or is generally oriented forward. Thus, unlike the forward panel 312 of the bifold flap 302, which inverts and/or reverses its orientation as the bifold flap 302 moves from the stowed position 304 of FIG. 3 into the deployed position 702 of FIG. 7, the bullnose 334, which pivots relative to the forward panel 312 of the bifold flap 302, generally maintains its orientation as the bifold flap 302 moves from the stowed position 304 of FIG. 3 into the deployed position 702 of FIG. 7.

As shown in FIG. 7, the first surface 336 of the bullnose 334 of the wing 300 is separated from the lower surface 308 of the wing 300 and/or from the trailing edge 310 of the wing 300 by an example gap 706 when the bifold flap 302 is in the deployed position 702 of FIG. 7. The presence of the gap 706 advantageously facilitates the aerodynamic passage of an airflow between the bullnose 334 of the wing 300 and the lower surface 308 and/or the trailing edge 310 of the wing 300. In this regard, the bullnose 334, the lower surface 308, and/or the trailing edge 310 of the wing 300 are respectively configured such that an airflow passes upward and/or rearward over the contoured second end 342 of the bullnose 334 of the wing 300, and then subsequently rearward through the gap 706 formed between the contoured first surface 336 of the bullnose 334 of the wing 300 on the one hand and the lower surface 308 and/or the trailing edge 310 of the wing 300 on the other hand. The contoured surface(s) of the bullnose 334 advantageously provide for an aerodynamically-tuned passage of the airflow through the gap 706 when the bifold flap 302 is in the deployed position 702 of FIG. 7.

In the illustrated example of FIGS. 3-7, the forward panel 312 has a length extending from the first edge 322 to the second edge 324 of the forward panel 312, the aft panel 314 has a length extending from the first edge 330 to the second edge 332 of the aft panel 314, and the bullnose 334 has a length extending from the first end 340 to the second end 342 of the bullnose 334. The length of the forward panel 312 is less than the length of the aft panel 314, and the length of the bullnose 334 is less than the length of the forward panel 312. For example, as shown in FIGS. 3-7, the length of the forward panel 312 is approximately one-half of the length of the aft panel 314, and the length of the bullnose 334 is approximately two-thirds of the length of the forward panel 312. In other examples, the extent to which the length of the forward panel 312 is less than the length of the aft panel 314 can differ, as can the extent to which the length of the bullnose 334 is less than the length of the forward panel 312.

The wing 300 of FIGS. 3-7 further includes an example structural rib 346, an example actuator 348, and an example linkage assembly 350. The structural rib 346 is positioned at a fixed location within the internal compartment 344 of the wing 300, with the structural rib 346 being spatially and/or physically bounded by the upper surface 306, the lower surface 308, and the trailing edge 310 of the wing 300. In the illustrated example of FIGS. 3-7, a portion (e.g., a fixed portion) of the actuator 348 is coupled to the structural rib 346. In other examples, the portion (e.g., the fixed portion) of the actuator 348 is instead coupled to another structural component of the wing 300. In the illustrated example of FIGS. 3-7, the actuator 348 is implemented as a rotary actuator configured to move (e.g., rotate or pivot) one or more component(s) of the linkage assembly 350 to effect movement of the bifold flap 302 of FIGS. 3-7 between the stowed position 304 of FIG. 3 and the deployed position 702 of FIG. 7. In other examples, the actuator 348 is instead implemented as a translational actuator configured to move (e.g., slide or extend) one or more component(s) of the linkage assembly 350 to effect movement of the bifold flap 302 of FIGS. 3-7 between the stowed position 304 of FIG. 3 and the deployed position 702 of FIG. 7.

The actuator 348 of FIGS. 3-7 is actuated, controlled, and/or operated by one or more control system(s) of the wing 300 and/or, more generally, of the aircraft that implements the wing 300. Such control system(s) can include an electrical control system operatively coupled to the actuator 348, a mechanical control system operatively coupled to the actuator 348, a hydraulic control system operatively coupled to the actuator 348, a pneumatic control system operatively coupled to the actuator 348, and/or any combination thereof.

In the illustrated example of FIGS. 3-7, the linkage assembly 350 is coupled to one or more portion(s) of the structural rib 346, to the actuator 348, to the bifold flap 302 (e.g., to the forward panel 312 and the aft panel 314 of the bifold flap 302), and to the bullnose 334 of the wing 300. The linkage assembly 350 is configured to move the bifold flap 302 between the stowed position 304 of FIG. 3 and the deployed position 702 of FIG. 7 in response to actuation of the actuator 348. As best shown in FIG. 6, the linkage assembly 350 of FIGS. 3-7 includes an example drive arm 606, an example drive coupler 608, an example crank 610, an example rocker 612, an example crank coupler 614, an example forward panel coupler 616, an example aft panel coupler 618, and an example bullnose coupler 620. In other examples, the linkage assembly 350 of the wing 300 can include a different number and/or a different arrangement of components relative to the components of the linkage assembly 350 of FIGS. 3-7 referenced above and further described herein.

In the illustrated example of FIGS. 3-7, a first end of the drive arm 606 is operatively coupled to the actuator 348, and a second end of the drive arm 606 is pivotally coupled to the drive coupler 608. A first end of the drive coupler 608 is pivotally coupled to the drive arm 606, and a second end of the drive coupler 608 is pivotally coupled to the crank 610. A first end of the crank 610 is pivotally coupled to the structural rib 346, and a second end of the crank 610 is pivotally coupled to the crank coupler 614. The crank 610 is also pivotally coupled to the drive coupler 608 at a location between the first and second ends of the crank 610. A first end of the rocker 612 is pivotally coupled to the structural rib 346, and a second end of the rocker 612 is pivotally coupled to the forward panel coupler 616. The rocker 612 is also pivotally coupled to the crank coupler 614 at a location between the first and second ends of the rocker 612. A first end of the crank coupler 614 is pivotally coupled to the crank 610, and a second end of the crank coupler 614 is pivotally coupled to the forward panel 312 of the bifold flap 302. The crank coupler 614 is also pivotally coupled to the rocker 612 and to the bullnose coupler 620 at respective locations between the first and second ends of the crank coupler 614.

A first end of the forward panel coupler 616 is pivotally coupled to the rocker 612, and a second end of the forward panel coupler 616 is pivotally coupled to the forward panel 312 of the bifold flap 302. The forward panel coupler 616 is also pivotally coupled to the aft panel coupler 618 at a location between the first and second ends of the forward panel coupler 616. A first end of the aft panel coupler 618 is pivotally coupled to the forward panel coupler 616, and a second end of the aft panel coupler 618 is pivotally coupled to the aft panel 314 of the bifold flap 302. A first end of the bullnose coupler 620 is pivotally coupled to the crank coupler 614, and a second end of the bullnose coupler 620 is pivotally coupled to the bullnose 334.

The forward panel 312 of the bifold flap 302 of the wing 300 is pivotally coupled to the aft panel 314 of the bifold flap 302 of the wing 300, to the bullnose 334 of the wing 300, to the crank coupler 614 of the linkage assembly 350 of the wing 300, and to the forward panel coupler 616 of the linkage assembly 350 of the wing 300 at separate locations along the second surface 320, the first edge 322, and/or the second edge 324 of the forward panel 312. The aft panel 314 of the bifold flap 302 of the wing 300 is pivotally coupled to the forward panel 312 of the bifold flap 302 of the wing 300 and to the aft panel coupler 618 of the linkage assembly 350 of the wing 300 at separate locations along or proximate to the first edge 330 of the aft panel 314.

The first end 340 of the bullnose 334 of the wing 300 is pivotally coupled to the forward panel 312 of the bifold flap 302 of the wing 300 along or proximate to the first edge 322 of the forward panel 312. The bullnose 334 of the wing 300 is also pivotally coupled to the bullnose coupler 620 of the linkage assembly 350 of the wing 300 at a location between the first end 340 and the second end 342 of the bullnose 334 along the second surface 338 of the bullnose 334. In the illustrated example of FIGS. 3-7, the bullnose coupler 620 of the linkage assembly 350 is configured to cause the bullnose 334 to pivot relative to the forward panel 312 of the bifold flap 302 as the bifold flap 302 moves between the stowed position 304 of FIG. 3 and the deployed position 702 of FIG. 7.

When the bifold flap 302 of FIGS. 3-7 is in the stowed position 304 of FIG. 3, the drive arm 606, the drive coupler 608, the crank 610, the rocker 612, the crank coupler 614, the forward panel coupler 616, the aft panel coupler 618, and the bullnose coupler 620 of the linkage assembly 350 are respectively located within (e.g., partially or fully within) the internal compartment 344 of the wing 300, with each of the drive arm 606, the drive coupler 608, the crank 610, the rocker 612, the crank coupler 614, the forward panel coupler 616, the aft panel coupler 618, and the bullnose coupler 620 being spatially and/or physically bounded (e.g., partially or fully bounded) by the upper surface 306, the lower surface 308, and the trailing edge 310 of the wing 300. As the bifold flap 302 of FIGS. 3-7 moves from the stowed position 304 of FIG. 3 into the deployed position 702 of FIG. 7, one or more portion(s) of the drive coupler 608, the crank 610, the rocker 612, the crank coupler 614, the forward panel coupler 616, the aft panel coupler 618, and the bullnose coupler 620 of the linkage assembly 350 exit and/or deploy from the internal compartment 344 of the wing 300 via the opening 604 formed in the lower surface 308 of the wing 300, thereby positioning at least a portion (e.g., the majority) of the bifold flap 302 rearward of the trailing edge 310 of the wing 300, and positioning the bullnose 334 below the lower surface 308 and/or below the trailing edge 310 of the wing 300.

Figure 8:
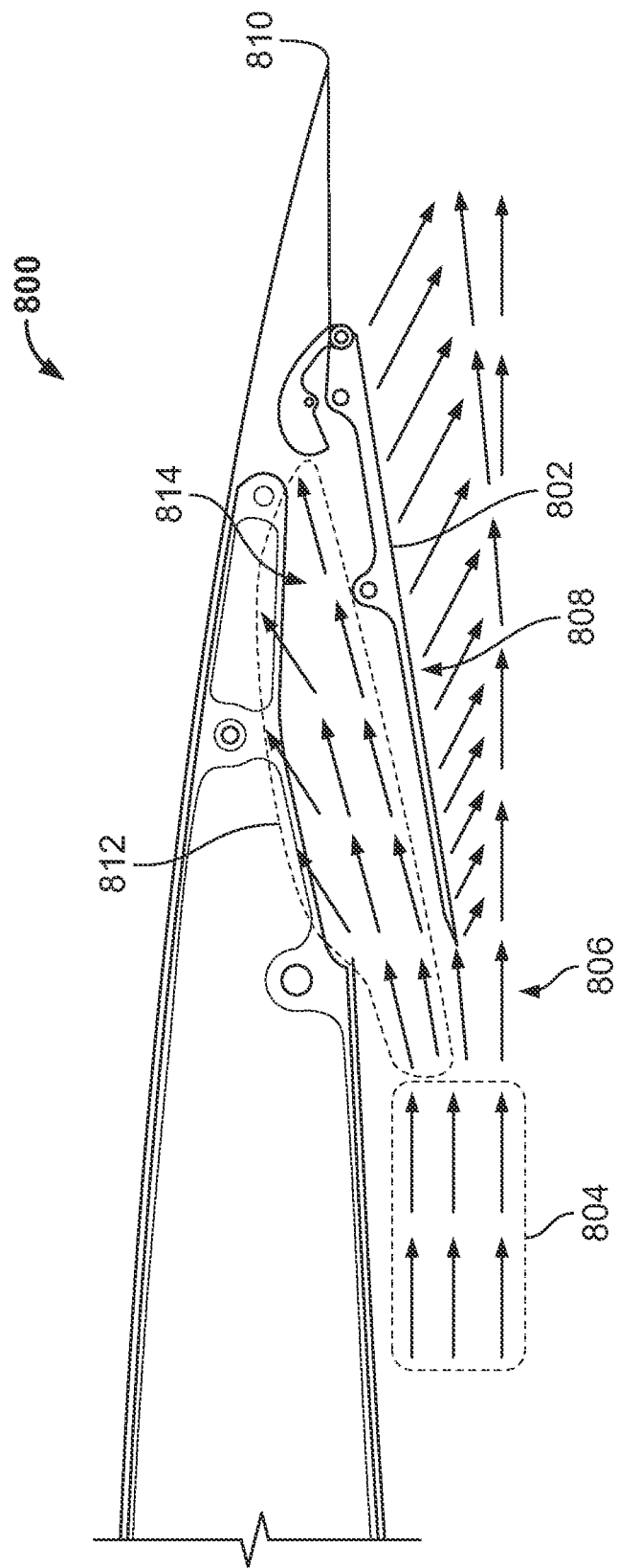
FIG. 8 is a cross-sectional view of an example alternate wing including an example monolithic flap, illustrating an example airflow profile resulting from an example streamwise airflow when the monolithic flap is in an example initial deployment position.

FIG. 8 is a cross-sectional view of an example alternate wing 800 including an example monolithic flap 802, illustrating an example airflow profile 806 resulting from an example streamwise airflow 804 when the monolithic flap 802 is in an example initial deployment position 808. The monolithic flap 802 of FIG. 8 is pivotably coupled to the alternate wing 800 and is movable relative to an example trailing edge 810 of the alternate wing 800 between a stowed position and a deployed position, similar to the manner in which the bifold flap 302 of FIGS. 3-7 is pivotably coupled to the wing 300 of FIGS. 3-7 and is movable relative to the trailing edge 310 of the wing 300 between the stowed position 304 of FIG. 3 and the deployed position 702 of FIG. 7. The monolithic flap 802 of FIG. 8 differs from the bifold flap 302 of FIG. 3-7 in that the monolithic flap 802 if formed from a single, non-foldable panel, while the bifold flap 302 is instead formed from multiple panels (e.g., the forward panel 312 and the aft panel 314) that are configured to be folded relative to one another.

The monolithic flap 802 of FIG. 8 assumes the initial deployment position 808 shown in FIG. 8 as the monolithic flap 802 first departs from its stowed position (e.g., along the lower surface of the alternate wing 800) in connection with moving from its stowed position into its deployed position. The monolithic flap 802 of FIG. 8 also assumes the initial deployment position 808 shown in FIG. 8 as the monolithic flap 802 approaches its stowed position in connection with returning from its deployed position. When the monolithic flap 802 is in the initial deployment position 808 of FIG. 8, the size, the shape, and the orientation of the monolithic flap 802 cause the airflow profile 806 of FIG. 8 to demonstrate an example scoop effect 812. The scoop effect 812 produces significant air loads directly on the monolithic flap 802, produces a positive pressure within an example internal compartment 814 of the alternate wing 800, and also produces a downward lift air load, all of which act to bias the monolithic flap 802 away from its stowed position and further toward its deployed position. The aforementioned loads and pressures individually and collectively increase the amount of force and/or energy that is required of a linkage assembly of the alternate wing 800 in order to fully return the monolithic flap 802 from its deployed position all the way into its stowed position.

Figure 9:
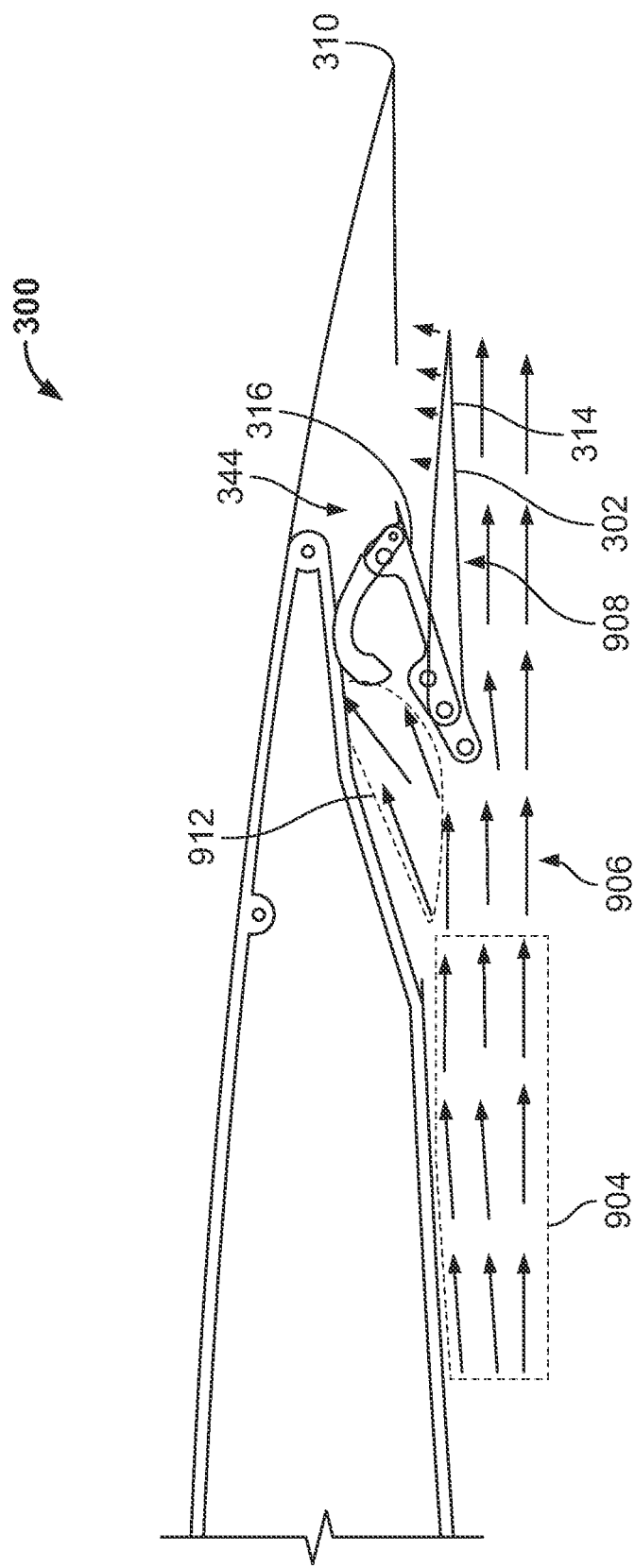
FIG. 9 is a cross-sectional view of the wing of FIGS. 3-7, illustrating a corresponding example airflow profile resulting from a corresponding example streamwise airflow when the bifold flap of FIGS. 3-7 is in a corresponding example initial deployment position.

FIG. 9 is a cross-sectional view of the wing 300 of FIGS. 3-7, illustrating a corresponding example airflow profile 906 (e.g., relative to the airflow profile 806 of FIG. 8) resulting from a corresponding example streamwise airflow 904 (e.g., relative to the streamwise airflow 804 of FIG. 8) when the bifold flap 302 of FIGS. 3-7 is in a corresponding example initial deployment position 908 (relative to the initial deployment position 808 of FIG. 8). The bifold flap 302 assumes the initial deployment position 908 shown in FIG. 9 as the bifold flap 302 first departs from the stowed position 304 of FIG. 3 in connection with moving from the stowed position 304 into the deployed position 702 of FIG. 7. The bifold flap 302 also assumes the initial deployment position 908 shown in FIG. 9 as the bifold flap 302 approaches the stowed position 304 of FIG. 3 in connection with returning from the deployed position 702 of FIG. 7.

When the bifold flap 302 is in the initial deployment position 908 of FIG. 9, the respective sizes, the respective shapes, and the respective orientations of the forward panel 312 and the aft panel 314 of the bifold flap 302 (e.g., the relatively small size of the forward panel 312, and the approximately streamwise orientation of the aft panel 314) cause the airflow profile 906 of FIG. 9 to demonstrate an example scoop effect 912 that is substantially reduced relative to the scoop effect 812 demonstrated by the monolithic flap 802 of FIG. 8 described above. In this regard, the scoop effect 912 associated with the bifold flap 302 advantageously produces loads and pressures in relation to the bifold flap 302 and the internal compartment 344 of the wing 300 that are significantly reduced relative to the corresponding loads and pressures produced via the scoop effect 812 associated with the monolithic flap 802 of FIG. 8. The reduced loads and pressures associated with the bifold flap 302 advantageously reduce the amount of force and/or energy that is required of a linkage assembly (e.g., the linkage assembly 350 of FIGS. 3-7) of the wing 300 in order to fully return the bifold flap 302 from the deployed position 702 of FIG. 7 all the way into the stowed position 304 of FIG. 3.

Figure 10:
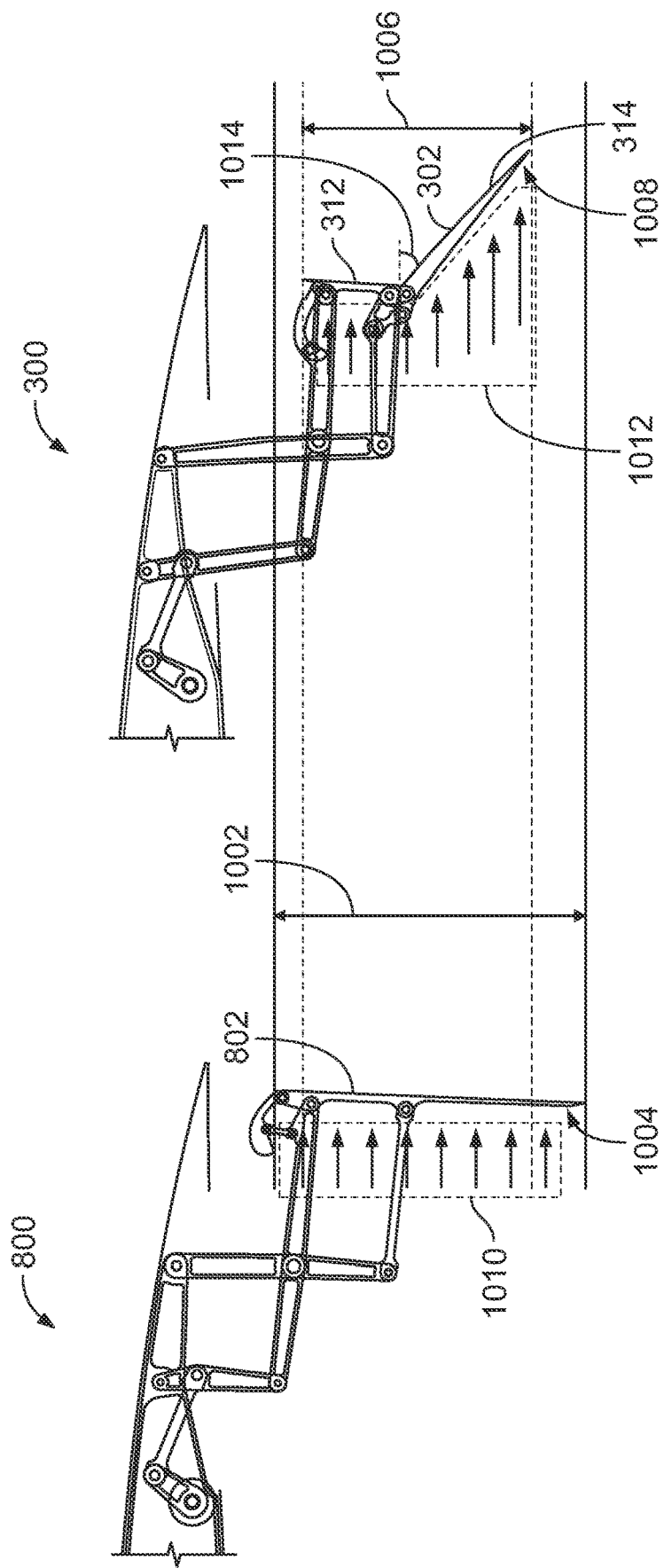
FIG. 10 is a cross-sectional view of the alternate wing of FIG. 8 and a corresponding cross-sectional view of the wing of FIGS. 3-7 and 9, illustrating an example vertical extent of the monolithic flap of the alternate wing of FIG. 8 when the monolithic flap is in an example mid-deployment position, and further illustrating a corresponding example vertical extent of the bifold flap of the wing of FIGS. 3-7 and 9 when the bifold flap is in a corresponding example mid-deployment position.

FIG. 10 is a cross-sectional view of the alternate wing 800 of FIG. 8 and a corresponding cross-sectional view of the wing 300 of FIGS. 3-7 and 9, illustrating an example vertical extent 1002 of the monolithic flap 802 of the alternate wing of 800 FIG. 8 when the monolithic flap 802 is in an example mid-deployment position 1004, and further illustrating a corresponding example vertical extent 1006 of the bifold flap 302 of the wing 300 of FIGS. 3-7 and 9 when the bifold flap 302 is in a corresponding example mid-deployment position 1008. As discussed above in connection with FIGS. 8 and 9, the monolithic flap 802 differs from the bifold flap 302 in that the monolithic flap 802 if formed from a single, non-foldable panel, while the bifold flap 302 is instead formed from multiple panels (e.g., the forward panel 312 and the aft panel 314) that are configured to be folded relative to one another.

The monolithic flap 802 assumes the mid-deployment position 1004 shown in FIG. 10 when the monolithic flap 802 is midway between its stowed position and its deployed position, as may occur either when moving the monolithic flap 802 from its stowed position into its deployed position, or when returning the monolithic flap 802 from its deployed position into its stowed position. Similarly, the bifold flap 302 assumes the corresponding mid-deployment position 1008 shown in FIG. 10 when the bifold flap 302 is midway between its stowed position (e.g., the stowed position 304 of FIG. 3) and its deployed position (e.g., the deployed position 702 of FIG. 7), as may occur either when moving the bifold flap 302 from its stowed position into its deployed position, or when returning the bifold flap 302 from its deployed position into its stowed position.

When the monolithic flap 802 is in the mid-deployment position 1004 of FIG. 10, the monolithic flap 802 has a substantially vertical orientation that is generally orthogonal to an example streamwise airflow 1010. The vertical extent 1002 of the monolithic flap 802 when so positioned is relatively large, which in turn causes the monolithic flap 802 to generate substantial adverse forces (e.g., substantial aerodynamic drag) in response to the streamwise airflow 1010. The aforementioned adverse forces increase the amount of force and/or energy that is required of a linkage assembly of the alternate wing 800 in order to return the monolithic flap 802 from its deployed position into its stowed position.

By contrast, when the bifold flap 302 is in the corresponding mid-deployment position 1008 of FIG. 10, only the forward panel 312 of the bifold flap 302 has a substantially vertical orientation that is generally orthogonal to a corresponding example streamwise airflow 1012. In this regard, the aft panel 314 of the bifold flap 302 is advantageously oriented at an example non-orthogonal angle 1014 relative to the corresponding streamwise airflow 1012, as opposed to being vertically oriented and generally orthogonal relative to the corresponding streamwise airflow 1012. The corresponding vertical extent 1006 of the bifold flap 302 when so positioned is relatively small (e.g., in comparison to the vertical extent 1002 of the monolithic flap 802), which in turn causes the bifold flap 302 to generate adverse forces (e.g., aerodynamic drag) in response to the corresponding streamwise airflow 1012 that are significantly reduced relative to the substantial adverse forces (e.g., substantial aerodynamic drag) produced by the monolithic flap 802 in response to the streamwise airflow 1010. The reduced adverse forces associated with the bifold flap 302 advantageously reduce the amount of force and/or energy that is required of a linkage assembly (e.g., the linkage assembly 350 of FIGS. 3-7) of the wing 300 in order to return the bifold flap 302 from the deployed position 702 of FIG. 7 into the stowed position 304 of FIG. 3.

As shown by above-described examples of FIGS. 8-10, the bifold flap 302 demonstrates improved aerodynamic load mitigation relative to the monolithic flap 802. The load reduction made possible by the bifold flap 302 (e.g., in lieu of the monolithic flap 802) offers many advantages and/or benefits including, for example: (a) creating a smoother (e.g., aerodynamically optimized) transition of between the deployed position and the stowed position; (b) facilitating the implementation of smaller, simpler, and less expensive actuator and linkage assembly components; and (c) improving structural fatigue properties associated with the actuator and linkage assembly components.

Figure 11:
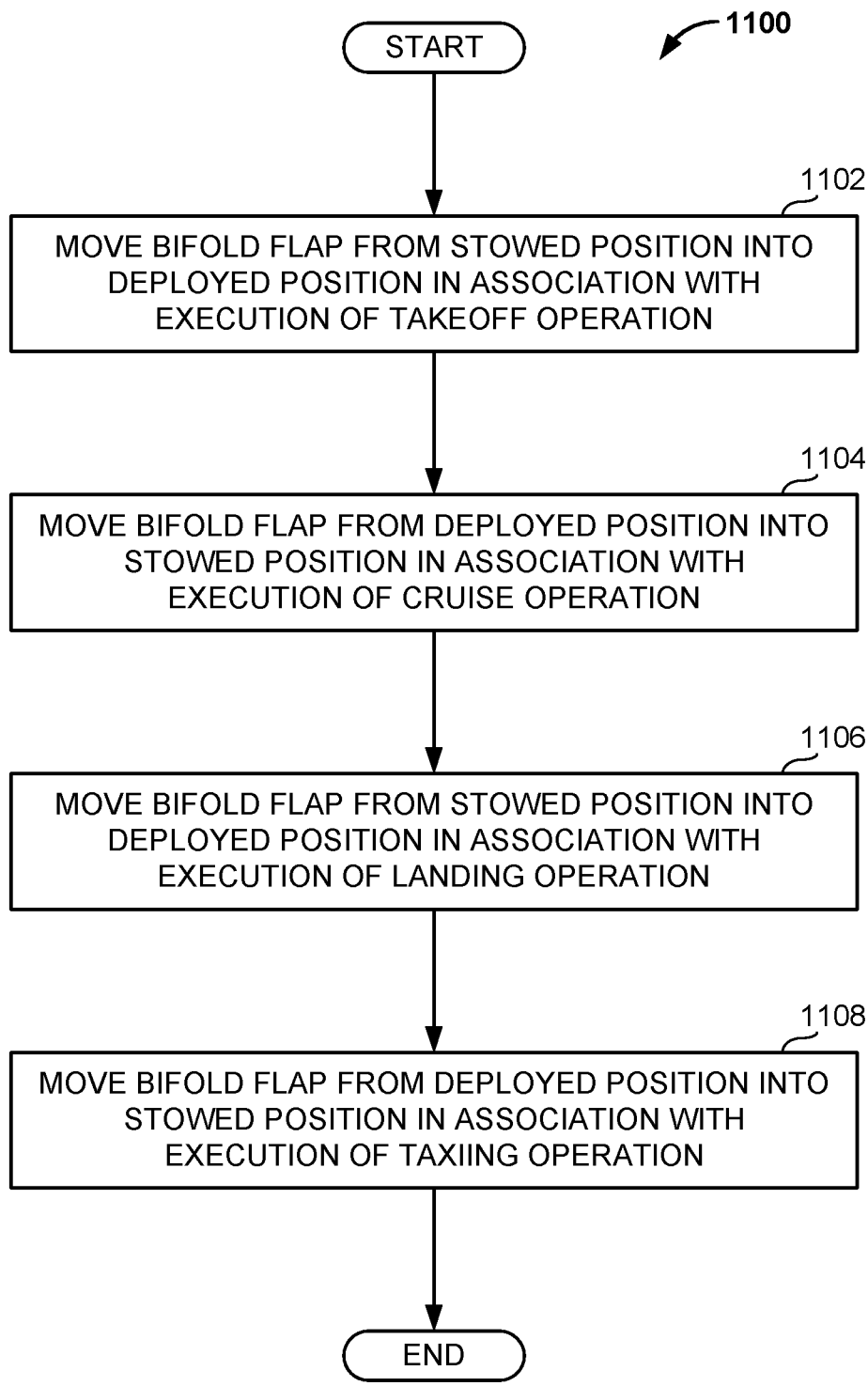
FIG. 11 is a flowchart representing an example method for operating the wing of FIGS. 3-7 during a flight of an aircraft implementing the wing.

FIG. 11 is a flowchart representing an example method 1100 for operating the wing 300 of FIGS. 3-7 during a flight of an aircraft implementing the wing 300. The operations of the method 1100 shown in FIG. 11 can be performed via one or more actuators (e.g., the actuator 348 of FIGS. 3-7), one or more linkage assemblies (e.g., the linkage assembly 350 of FIGS. 3-7), and/or one or more control systems (e.g., an electrical control system, a mechanical control system, a hydraulic control system, a pneumatic control system, etc.) of the aircraft.

The method 1100 of FIG. 11 begins with Block 1102. At Block 1102, the bifold flap 302 of the wing 300 of FIGS. 3-7 moves from a stowed position (e.g., the stowed position 304 of FIG. 3) to a deployed position (e.g., the deployed position 702 of FIG. 7) in association with the execution of a takeoff operation of the aircraft. Moving the bifold flap 302 from the stowed position to the deployed position in connection with Block 1102 increases the camber of the wing 300. Moving the bifold flap 302 from the stowed position to the deployed position in connection with Block 1102 also causes the aft panel 314 of the bifold flap 302 to unfold from (e.g., fold away from) the forward panel 312 of the bifold flap 302. In some examples, moving the bifold flap 302 from the stowed position to the deployed position in connection with Block 1102 causes the bullnose 334 of the wing 300 to pivot relative to the forward panel 312 of the bifold flap 302 of the wing 300, and further causes the bullnose 334 to become located below the trailing edge 310 of the wing 300.

Block 1104 of the method 1100 of FIG. 11 follows Block 1102 of the method 1100. At Block 1104, the bifold flap 302 of the wing 300 of FIGS. 3-7 moves from a deployed position (e.g., the deployed position 702 of FIG. 7) to a stowed position (e.g., the stowed position 304 of FIG. 3) in association with the execution of a cruise operation of the aircraft. Moving the bifold flap 302 from the deployed position to the stowed position in connection with Block 1104 decreases the camber of the wing 300. Moving the bifold flap 302 from the deployed position to the stowed position in connection with Block 1104 also causes the aft panel 314 of the bifold flap 302 to fold toward the forward panel 312 of the bifold flap 302. In some examples, moving the bifold flap 302 from the deployed position to the stowed position in connection with Block 1104 causes the bullnose 334 of the wing 300 to pivot relative to the forward panel 312 of the bifold flap 302 of the wing 300, and further causes the bullnose 334 to become located entirely within an internal compartment (e.g., the internal compartment 344) of the wing 300.

Block 1106 of the method 1100 of FIG. 11 follows Block 1104 of the method 1100. At Block 1106, the bifold flap 302 of the wing 300 of FIGS. 3-7 moves from a stowed position (e.g., the stowed position 304 of FIG. 3) to a deployed position (e.g., the deployed position 702 of FIG. 7) in association with the execution of a landing operation of the aircraft. Moving the bifold flap 302 from the stowed position to the deployed position in connection with Block 1106 increases the camber of the wing 300. Moving the bifold flap 302 from the stowed position to the deployed position in connection with Block 1106 also causes the aft panel 314 of the bifold flap 302 to unfold from (e.g., fold away from) the forward panel 312 of the bifold flap 302. In some examples, moving the bifold flap 302 from the stowed position to the deployed position in connection with Block 1106 causes the bullnose 334 of the wing 300 to pivot relative to the forward panel 312 of the bifold flap 302 of the wing 300, and further causes the bullnose 334 to become located below the trailing edge 310 of the wing 300.

Block 1108 of the method 1100 of FIG. 11 follows Block 1106 of the method 1100. At Block 1108, the bifold flap 302 of the wing 300 of FIGS. 3-7 moves from a deployed position (e.g., the deployed position 702 of FIG. 7) to a stowed position (e.g., the stowed position 304 of FIG. 3) in association with the execution of a taxiing operation of the aircraft. Moving the bifold flap 302 from the deployed position to the stowed position in connection with Block 1108 decreases the camber of the wing 300. Moving the bifold flap 302 from the deployed position to the stowed position in connection with Block 1108 also causes the aft panel 314 of the bifold flap 302 to fold toward the forward panel 312 of the bifold flap 302. In some examples, moving the bifold flap 302 from the deployed position to the stowed position in connection with Block 1108 causes the bullnose 334 of the wing 300 to pivot relative to the bifold flap 302 of the wing 300, and further causes the bullnose 334 to become located entirely within an internal compartment (e.g., the internal compartment 344) of the wing 300. Following Block 1108, the method 1100 of FIG. 11 ends.

The method 1100 of FIG. 11 includes example operations associated with the bifold flap 302 of the wing 300 of FIGS. 3-7 during a flight of an aircraft implementing the wing 300. In some examples, the example operations (e.g., Block 1102, Block 1104, Block 1106, and Block 1108) included in the method 1100 of FIG. 11 are performed according to the specific sequence shown in FIG. 11. In other examples, one or more of the example operations (e.g., Block 1102, Block 1104, Block 1106, and Block 1108) included in the method 1100 of FIG. 11 can be repeated, reordered, or omitted relative to one or more of the other example operations (e.g., Block 1102, Block 1104, Block 1106, and Block 1108) included in the method 1100 of FIG. 11, and/or can be preceded or followed by one or more other operations associated with the bifold flap 302 of the wing 300 but not expressly shown in FIG. 11.

From the foregoing, it will be appreciated that underwing-mounted trailing edge bifold flaps for wings of aircraft disclosed herein are movable between a stowed position located along a lower surface of the wing and a deployed position located rearward of the trailing edge of the wing. Movement of the bifold flap is facilitated via a linkage assembly, the vast majority of which can be stowed within an internal compartment of the wing when the flap is in the stowed position. The aforementioned configuration of the linkage assembly advantageously eliminates the need for any fairing located along the underside of the wing (e.g., as may occur with track or linkage-deployed Fowler flaps), thereby reducing the significant parasitic drag that is attributable to such fairings. The reduction in drag provides for a corresponding increase in fuel efficiency associated with operating the aircraft. Movement of the bifold flap from the stowed position into the deployed position also advantageously increases both the effective area and the camber of the wing. Lower approach speeds are attainable due to the increased wing area and the increased camber, thereby providing for a safer aircraft that is capable of landing at airfields having relatively short runways or landing strips.

In some disclosed examples, the bifold flap includes a forward panel and an aft panel. The aft panel is pivotally coupled to the forward panel and foldable relative thereto. In some disclosed examples, the aft panel is folded toward the forward panel when the bifold flap is in the stowed position, and the aft panel is unfolded from the forward panel when the bifold flap is in the deployed position. Numerous performance benefits associated with the bifold flap (e.g., relative to a monolithic flap of a similar size and shape) are directly attributable to the foldable nature of the forward and aft panels of the bifold flap.

For example, when the bifold flap is in an initial deployment position (e.g., a scoop position), the respective sizes, the respective shapes, and the respective orientations of the forward and aft panels of the bifold flap cause an airflow profile associated with the bifold flap to demonstrate a scoop effect that is substantially reduced relative to a corresponding scoop effect demonstrated by a similarly sized and shaped monolithic flap. In this regard, the scoop effect associated with the bifold flap advantageously produces loads and pressures in relation to the bifold flap that are significantly reduced relative to the corresponding loads and pressures produced via the corresponding scoop effect associated with the monolithic flap. The reduced loads and pressures associated with the bifold flap when positioned in the initial deployment position advantageously reduce the amount of force and/or energy that is required of a linkage assembly in order to fully return the bifold flap from its deployed position all the way into its stowed position.

As another example, when the bifold flap is in a mid-deployment position (e.g., a barn door position), only the forward panel of the bifold flap has a substantially vertical orientation that is generally orthogonal to a streamwise airflow. By contrast, the aft panel of the bifold flap is advantageously oriented at a non-orthogonal angle relative to the streamwise airflow. The vertical extent of the bifold flap when so positioned is relatively small (e.g., in comparison to the vertical extent of a similarly sized and shaped monolithic flap), which in turn causes the bifold flap to generate adverse forces (e.g., aerodynamic drag) in response to the streamwise airflow that are significantly reduced (e.g., in comparison to the substantial adverse forces (e.g., substantial aerodynamic drag) produced by a similarly sized and shaped monolithic flap in response to a corresponding streamwise airflow). The reduced adverse forces associated with the bifold flap when positioned in the mid-deployment position advantageously reduce the amount of force and/or energy that is required of a linkage assembly in order to return the bifold flap from its deployed position into its stowed position.

The bifold flap demonstrates improved aerodynamic load mitigation relative to a similarly sized and shaped monolithic flap. The load reduction, which is directly attributable to the foldable nature of the forward and aft panels of the bifold flap, offers many advantages and/or benefits including, for example: (a) creating a smoother (e.g., aerodynamically optimized) transition of between the deployed position and the stowed position; (b) facilitating the implementation of smaller, simpler, and less expensive actuator and linkage assembly components; and (c) improving structural fatigue properties associated with the actuator and linkage assembly components.

In some disclosed examples, the wing advantageously includes a bullnose pivotally coupled to the bifold flap. The bullnose is located along an edge of the forward panel of the bifold flap, and is configured to pivot relative to the forward panel as the bifold flap moves between the stowed position and the deployed position. The bifold flap, the bullnose, and the linkage assembly are configured such that the bullnose is located entirely within an internal compartment of the wing when the bifold flap is in the stowed position, and such that the bullnose is located below the trailing edge of the wing when the bifold flap is in the deployed position. The bullnose includes a contoured surface that advantageously provides for an aerodynamically-tuned passage of an airflow through a gap located between the contoured surface of the bullnose and the trailing edge of the wing when the bifold flap is in the deployed position.

The following paragraphs provide various examples in relation to the underwing-mounted trailing edge bifold flaps for wings of aircraft disclosed herein.

Example 1 includes a wing of an aircraft. In Example 1, the wing comprises an upper surface, a lower surface located opposite the upper surface, and a trailing edge located between the upper surface and the lower surface. In Example 1, the wing further comprises a bifold flap pivotally coupled to the wing. In Example 1, the bifold flap is movable between a stowed position located along the lower surface and a deployed position located rearward of the trailing edge. In Example 1, the bifold flap includes a forward panel and an aft panel. In Example 1, the aft panel is pivotally coupled to the forward panel. In Example 1, the aft panel is foldable relative to the forward panel. In Example 1, the aft panel is folded toward the forward panel when the bifold flap is in the stowed position. In Example 1, the aft panel is unfolded from the forward panel when the bifold flap is in the deployed position. In Example 1, the wing further comprises a bullnose pivotally coupled to the forward panel.

Example 2 includes the wing of Example 1, wherein the bullnose is configured to pivot relative to the forward panel as the bifold flap moves between the stowed position and the deployed position.

Example 3 includes the wing of Example 1, wherein the bullnose is pivotally coupled to a bullnose coupler of a linkage assembly of the wing. In Example 3, the bullnose coupler is configured to cause the bullnose to pivot relative to the forward panel as the bifold flap moves between the stowed position and the deployed position.

Example 4 includes the wing of Example 1, wherein the aft panel substantially overlaps the forward panel when the bifold flap is in the stowed position, and wherein the aft panel is located rearward of the forward panel when the bifold flap is in the deployed position.

Example 5 includes the wing of Example 1, wherein the forward panel includes a first edge, a second edge located opposite the first edge, a first surface extending between the first edge and the second edge, and a second surface located opposite the first surface and extending between the first edge and the second edge, and wherein the aft panel includes a third edge, a fourth edge located opposite the third edge, a third surface extending between the third edge and the fourth edge, and a fourth surface located opposite the third surface and extending between the third edge and the fourth edge.

Example 6 includes the wing of Example 5, wherein the bullnose is located along the first edge of the forward panel.

Example 7 includes the wing of Example 5, wherein the second edge of the forward panel is pivotally coupled to the third edge of the aft panel.

Example 8 includes the wing of Example 5, wherein the first surface of the forward panel faces toward the third surface of the aft panel when the bifold flap is in the stowed position, and wherein the first surface of the forward panel and the third surface of the aft panel both face toward a common direction when the bifold flap is in the deployed position.

Example 9 includes the wing of Example 5, wherein the first edge of the forward panel is located rearward of the second edge of the forward panel and the third edge of the aft panel is located forward of the fourth edge of the aft panel when the bifold flap is in the stowed position, and wherein the first edge of the forward panel is located forward of the second edge of the forward panel and the third edge of the aft panel is located forward of the fourth edge of the aft panel when the bifold flap is in the deployed position.

Example 10 includes the wing of Example 1, wherein the trailing edge is a fixed trailing edge. In Example 10, the bullnose is located below the fixed trailing edge when the bifold flap is in the deployed position.

Example 11 includes the wing of Example 10, wherein the bullnose is separated from the fixed trailing edge by a gap when the bifold flap is in the deployed position.

Example 12 includes the wing of Example 1. In Example 12, the wing further comprises an actuator and a linkage assembly. In Example 12, the linkage assembly is coupled to the actuator, to the bifold flap, and to the bullnose. In Example 12, the linkage assembly is configured to move the bifold flap between the stowed position and the deployed position in response to actuation of the actuator.

Example 13 includes the wing of Example 12, wherein the linkage assembly includes a drive arm, a drive coupler, a crank, a rocker, a crank coupler, a forward panel coupler, an aft panel coupler, and a bullnose coupler. In Example 13, the drive arm is coupled to the actuator, the drive coupler is pivotally coupled to the drive arm, the crank is pivotally coupled to the drive coupler, the crank coupler is pivotally coupled to the crank, the bullnose coupler is pivotally coupled to the crank coupler, the rocker is pivotally coupled to the crank coupler, the forward panel coupler is pivotally coupled to the rocker, the aft panel coupler is pivotally coupled to the forward panel coupler, the forward panel is pivotally coupled to the crank coupler and pivotally coupled to the forward panel coupler, the aft panel is pivotally coupled to the aft panel coupler, and the bullnose is pivotally coupled to the bullnose coupler.

Example 14 is a method. The method of Example 14 comprises moving a bifold flap pivotally coupled to a wing of an aircraft. In Example 14, the wing includes an upper surface, a lower surface located opposite the upper surface, a trailing edge located between the upper surface and the lower surface, and a bullnose. In Example 14, the bifold flap is movable between a stowed position located along the lower surface and a deployed position located rearward of the trailing edge. In Example 14, the bifold flap includes a forward panel and an aft panel. In Example 14, the aft panel is pivotally coupled to the forward panel. In Example 14, the aft panel is foldable relative to the forward panel. In Example 14, the aft panel is folded toward the forward panel when the bifold flap is in the stowed position. In Example 14, the aft panel is unfolded from the forward panel when the bifold flap is in the deployed position. In Example 14, the bullnose is pivotally coupled to the forward panel.

Example 15 includes the method of Example 14. In Example 15, the method further comprises pivoting the bullnose relative to the forward panel as the bifold flap moves between the stowed position and the deployed position.

Example 16 includes the method of Example 14, wherein the bullnose is pivotally coupled to a bullnose coupler of a linkage assembly of the wing. In Example 16, the method further comprises pivoting the bullnose relative to the forward panel via the bullnose coupler as the bifold flap moves between the stowed position and the deployed position.

Example 17 includes the method of Example 14. In Example 17, moving the bifold flap includes substantially overlapping the forward panel with the aft panel when the bifold flap is in the stowed position. In Example 17, moving the bifold flap further includes positioning the aft panel rearward of the forward panel when the bifold flap is in the deployed position.

Example 18 includes the method of Example 14, wherein the trailing edge is a fixed trailing edge. In Example 18, the method further comprises locating the bullnose below the fixed trailing edge when the bifold flap is in the deployed position.

Example 19 includes the method of Example 18. In Example 18, the method further comprises separating the bullnose from the fixed trailing edge by a gap when the bifold flap is in the deployed position.

Example 20 includes the method of Example 14. In Example 20, moving the bifold flap between the stowed position and the deployed position includes actuating an actuator of the wing. In Example 20, the actuator is coupled to a linkage assembly of the wing. In Example 20, the linkage assembly is coupled to the bifold flap and to the bullnose. In Example 20, the linkage assembly moves the bifold flap between the stowed position and the deployed position in response to actuation of the actuator.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A wing of an aircraft, the wing comprising:
    an upper surface;
    a lower surface located opposite the upper surface;
    a trailing edge;
    a bifold flap pivotally coupled to the wing, the bifold flap movable between a stowed position located along the lower surface and a deployed position located rearward of the trailing edge, the bifold flap including:
        a forward panel; and
        an aft panel, the aft panel pivotally coupled to the forward panel, the aft panel foldable relative to the forward panel, the aft panel folded toward the forward panel when the bifold flap is in the stowed position, the aft panel unfolded from the forward panel when the bifold flap is in the deployed position; and
    a bullnose pivotally coupled to the forward panel.

2. The wing of claim 1, wherein the bullnose is configured to pivot relative to the forward panel as the bifold flap moves between the stowed position and the deployed position.

3. The wing of claim 1, further including a linkage assembly having a bullnose coupler, the linkage assembly to couple the bullnose and the wing, the bullnose pivotally coupled to the bullnose coupler of the linkage assembly of the wing, the bullnose coupler configured to cause the bullnose to pivot relative to the forward panel as the bifold flap moves between the stowed position and the deployed position.

4. The wing of claim 1, wherein the aft panel substantially overlaps the forward panel when the bifold flap is in the stowed position, and wherein the aft panel is located rearward of the forward panel when the bifold flap is in the deployed position.

5. The wing of claim 1, wherein the forward panel includes a first edge, a second edge located opposite the first edge, a first surface extending between the first edge and the second edge, and a second surface located opposite the first surface and extending between the first edge and the second edge, and wherein the aft panel includes a third edge, a fourth edge located opposite the third edge, a third surface extending between the third edge and the fourth edge, and a fourth surface located opposite the third surface and extending between the third edge and the fourth edge.

6. The wing of claim 5, wherein the bullnose is located along the first edge of the forward panel.

7. The wing of claim 5, wherein the second edge of the forward panel is pivotally coupled to the third edge of the aft panel.

8. The wing of claim 5, wherein the first surface of the forward panel faces toward the third surface of the aft panel when the bifold flap is in the stowed position, and wherein the first surface of the forward panel and the third surface of the aft panel both face toward a common direction when the bifold flap is in the deployed position.

9. The wing of claim 5, wherein the first edge of the forward panel is located rearward of the second edge of the forward panel and the third edge of the aft panel is located forward of the fourth edge of the aft panel when the bifold flap is in the stowed position, and wherein the first edge of the forward panel is located forward of the second edge of the forward panel and the third edge of the aft panel is located forward of the fourth edge of the aft panel when the bifold flap is in the deployed position.

10. The wing of claim 1, wherein the trailing edge is a fixed trailing edge, and wherein the bullnose is located below the fixed trailing edge when the bifold flap is in the deployed position.

11. The wing of claim 10, wherein the bullnose is separated from the fixed trailing edge by a gap when the bifold flap is in the deployed position.

12. The wing of claim 1, further comprising:
    an actuator; and
    a linkage assembly coupled to the actuator, to the bifold flap, and to the bullnose, the linkage assembly configured to move the bifold flap between the stowed position and the deployed position in response to actuation of the actuator.

13. The wing of claim 12, wherein the linkage assembly includes a drive arm, a drive coupler, a crank, a rocker, a crank coupler, a forward panel coupler, an aft panel coupler, and a bullnose coupler, and wherein the drive arm is coupled to the actuator, the drive coupler is pivotally coupled to the drive arm, the crank is pivotally coupled to the drive coupler, the crank coupler is pivotally coupled to the crank, the bullnose coupler is pivotally coupled to the crank coupler, the rocker is pivotally coupled to the crank coupler, the forward panel coupler is pivotally coupled to the rocker, the aft panel coupler is pivotally coupled to the forward panel coupler, the forward panel is pivotally coupled to the crank coupler and pivotally coupled to the forward panel coupler, the aft panel is pivotally coupled to the aft panel coupler, and the bullnose is pivotally coupled to the bullnose coupler.

14. A method, comprising:
    moving a bifold flap pivotally coupled to a wing of an aircraft, the wing including an upper surface, a lower surface located opposite the upper surface, a trailing edge, and a bullnose, the bifold flap movable between a stowed position located along the lower surface and a deployed position located rearward of the trailing edge, the bifold flap including a forward panel and an aft panel, the aft panel pivotally coupled to the forward panel, the aft panel foldable relative to the forward panel, the aft panel folded toward the forward panel when the bifold flap is in the stowed position, the aft panel unfolded from the forward panel when the bifold flap is in the deployed position, the bullnose pivotally coupled to the forward panel.

15. The method of claim 14, further comprising pivoting the bullnose relative to the forward panel as the bifold flap moves between the stowed position and the deployed position.

* * * * *